(12) United States Patent
Kyrynyuk et al.

(10) Patent No.: US 8,823,664 B2
(45) Date of Patent: Sep. 2, 2014

(54) CLOSE TOUCH DETECTION AND TRACKING

(75) Inventors: Valeriy Kyrynyuk, Lviv (UA); Serhiy Prudkyy, Lviv (UA); Vasyl Mandziy, Shchyrec Vil. (UA)

(73) Assignee: Cypress Semiconductor Corporation, San Jose, CA (US)

( * ) Notice: Subject to any disclaimer, the term of this patent is extended or adjusted under 35 U.S.C. 154(b) by 389 days.

(21) Appl. No.: 13/424,336

(22) Filed: Mar. 19, 2012

(65) Prior Publication Data

US 2013/0222331 A1 Aug. 29, 2013

Related U.S. Application Data

(60) Provisional application No. 61/602,809, filed on Feb. 24, 2012.

(51) Int. Cl.
*G06F 3/044* (2006.01)
*G06F 3/041* (2006.01)

(52) U.S. Cl.
USPC ........................................ 345/173; 178/18.01

(58) Field of Classification Search
USPC .................... 345/173–178; 178/18.01, 18.03
See application file for complete search history.

(56) References Cited

U.S. PATENT DOCUMENTS

| | | | |
|---|---|---|---|
| 5,825,352 A | 10/1998 | Bisset et al. | |
| 7,663,607 B2 | 2/2010 | Hotelling et al. | |
| 7,812,828 B2 * | 10/2010 | Westerman et al. | 345/173 |
| 7,916,126 B2 | 3/2011 | Westerman et al. | |
| 2007/0070051 A1 | 3/2007 | Westerman et al. | |
| 2009/0244031 A1 | 10/2009 | Westerman et al. | |
| 2010/0073318 A1 | 3/2010 | Hu et al. | |
| 2010/0079383 A1 * | 4/2010 | Suggs | 345/173 |
| 2010/0085323 A1 | 4/2010 | Bogue | |
| 2010/0097342 A1 | 4/2010 | Simmons et al. | |
| 2010/0119124 A1 | 5/2010 | Satyan | |
| 2010/0193258 A1 | 8/2010 | Simmons et al. | |
| 2010/0194696 A1 | 8/2010 | Chang et al. | |
| 2011/0007027 A1 | 1/2011 | Chen et al. | |
| 2011/0012856 A1 | 1/2011 | Maxwell et al. | |

(Continued)

FOREIGN PATENT DOCUMENTS

| | | |
|---|---|---|
| CN | 101071356 A | 11/2007 |
| CN | 101071356 A | 1/2011 |
| WO | 2011081241 A | 7/2011 |

OTHER PUBLICATIONS

Ankur Agarwal and Shahram Izadi_High Precision Multi-touch Sensing on Surfaces using Overhead Cameras_Dated_4 Pages.

(Continued)

*Primary Examiner* — Andrew Sasinowski

(57) ABSTRACT

A method of tracking touches at a touch-sensing surface may include, detecting an initial location of a first contact and an initial location of a second contact at the touch-sensing surface based on a first scan of a touch-sensing surface, detecting a plurality of signal levels caused by the first contact and the second contact during a second scan of the touch-sensing surface, identifying a first signal level of the plurality of signal levels as a local maximum, and locating a lost touch based on one or more signal levels associated with one or more unit cells within a fixed distance from a first unit cell associated with the local maximum.

20 Claims, 24 Drawing Sheets

(56) References Cited

U.S. PATENT DOCUMENTS

| | | |
|---|---|---|
| 2011/0018837 A1 | 1/2011 | Chen et al. |
| 2011/0025629 A1* | 2/2011 | Grivna et al. ................ 345/173 |
| 2011/0141054 A1 | 6/2011 | Wu et al. |
| 2011/0216036 A1 | 9/2011 | Zhang et al. |
| 2011/0216038 A1 | 9/2011 | Stolov et al. |
| 2011/0216042 A1 | 9/2011 | Wassvik et al. |
| 2011/0242028 A1 | 10/2011 | Lee et al. |
| 2012/0044150 A1 | 2/2012 | Karpin et al. |

OTHER PUBLICATIONS

Search Report for U.S. Appl. No. 13/424,336, Dated Jan. 2012, 12 pages.

Thiago Araujo and Antonio Lima_Detecting hands, fingers and blobs for multi-touch display applications_Dated Jun. 21, 2009_7 pages.

Entries Tagged 'Capacitive Touch'_Dated Apr. 12, 2011_4 pages.

Ramon Hofer Kraner_Tracking Technologies for Interactive Tabletop Surfaces_Dated 2011_196 pages.

Search Report for U.S. Appl. No. 13/424,336, Dated Mar. 2012, 18 pages.

International Search Report for International Application No. PCT/US20121052702 dated Nov. 6, 2012; 2 pages.

Written Opinion of the International Searching Authority for International Application No. PCT/US2012/052702 mailed Nov. 6, 2012; 5 pages.

* cited by examiner

| 0 | 0 | 0 | 1 | 2 | 0 |
| 0 | 0 | 2 | 11 | 1 | 0 |
| 0 | 8 | 15 | 46 | 14 | 2 |
| 6 | 39 | 19 | 16 | 1 | 0 |
| 0 | 15 | 2 | 0 | 0 | 0 |
| 0 | 0 | 0 | 0 | 0 | 0 |

CLOSE TOUCH DETECTION AND TRACKING

CROSS REFERENCE TO RELATED APPLICATIONS

This application claims priority to U.S. Provisional Application No. 61/602,809, filed on Feb. 24, 2012, which is hereby incorporated by reference.

TECHNICAL FIELD

This disclosure relates to the field of touch-sensors and, in particular, to the detection and tracking of close touches at a capacitive touch-sensing surface.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor elements that detect the position of one or more conductive objects, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch windows, touch panels, or touchscreen panels, are transparent display overlays which are typically either pressure-sensitive (resistive or piezoelectric), electrically-sensitive (capacitive), acoustically-sensitive (surface acoustic wave (SAW)) or photo-sensitive (infra-red). The effect of such overlays allows a display to be used as an input device, removing the keyboard and/or the mouse as the primary input device for interacting with the display's content. Such displays can be attached to computers or, as terminals, to networks. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to touch the surface of a touch screen, to select an item from a menu.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

The performance of a touchscreen may be affected by many factors. Such performance characteristics may include the precision with which a touch position may be located, linearity when tracking a moving touch, proper detection of multiple touches, and proper recognition of gestures.

One embodiment of an method for searching and processing touches at a touch-sensing surface may not be able to detected close touches, where the distance between touches is less than three times the sensor pitch. For example, when touches are close together, some touches may be lost and linearity may degrade when tracking the motion of the close touches.

Figure 3A:
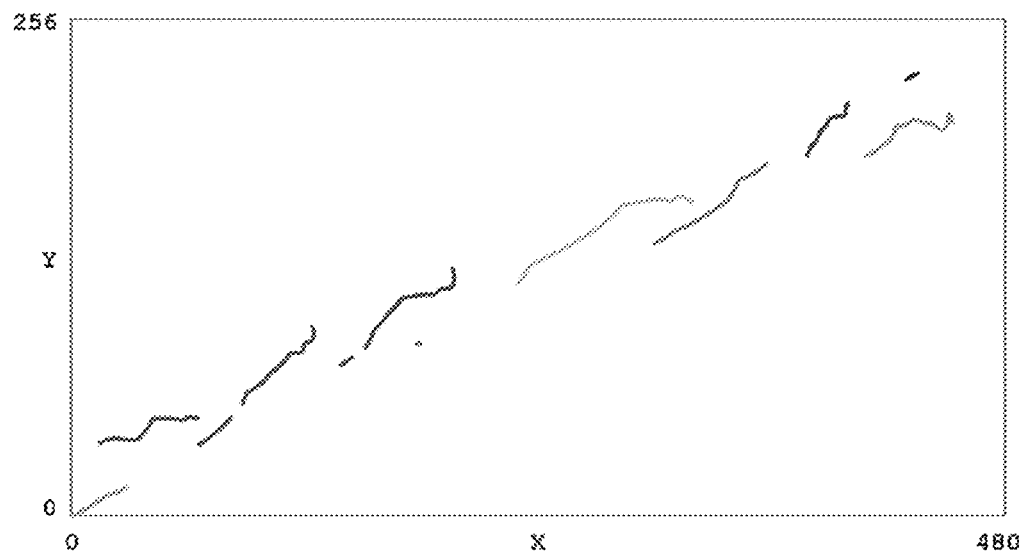
FIGS. 3A and 3B illustrate paths of conductive objects as tracked across a touch-sensing surface, according to one embodiment.
Figure 3B:
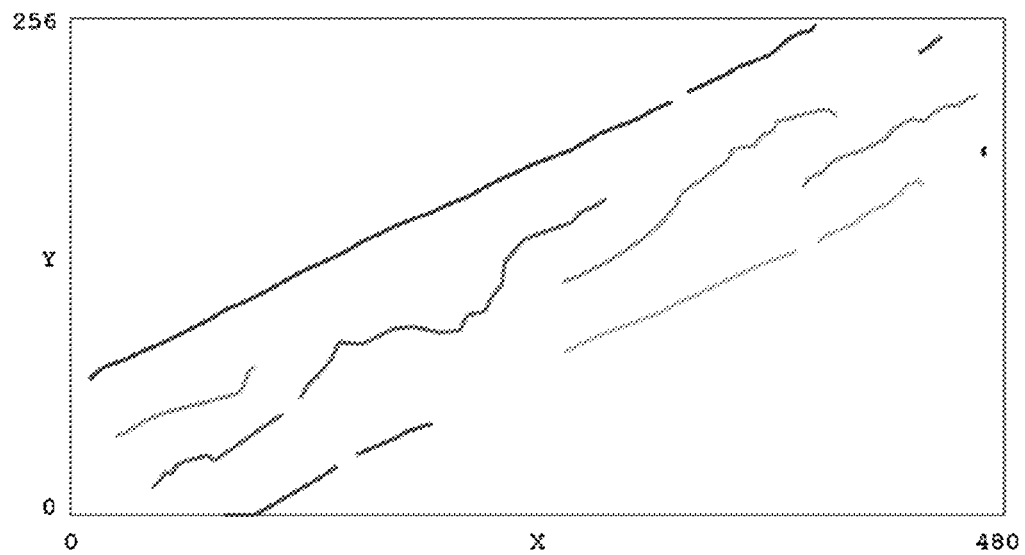

FIGS. 3A and 3B illustrate the tracked paths of multiple touches at a touch-sensing surface, where the closeness of the touches causes inaccuracies in the calculated locations and paths, according to one embodiment. Specifically, FIG. 3A illustrates the detected paths of two conductive objects each having a diameter of 11 millimeters and separated by a gap of 2 millimeters between their edges. FIG. 3B illustrates the detected paths of four 8 millimeter diameter conductive objects separated by a gap of 3 millimeters between their edges.

Because of the closeness of the conductive objects at the surface, the system may also have difficulty interpreting continuous moving touches. In FIG. 3A, for example, each of the separate line segments may be assigned a different touch identification (touch ID) even when they are caused by the same object.

One method for designing a touch-sensing system to more accurately detect and track close touches is to decrease the pitch size to less than two times the size of the object, such as a finger, that touches the surface. Alternatively, specialized processing may be used to detect "lost" touches and improve the linearity of a path of the touches when the touches are close together.

Figure 4:
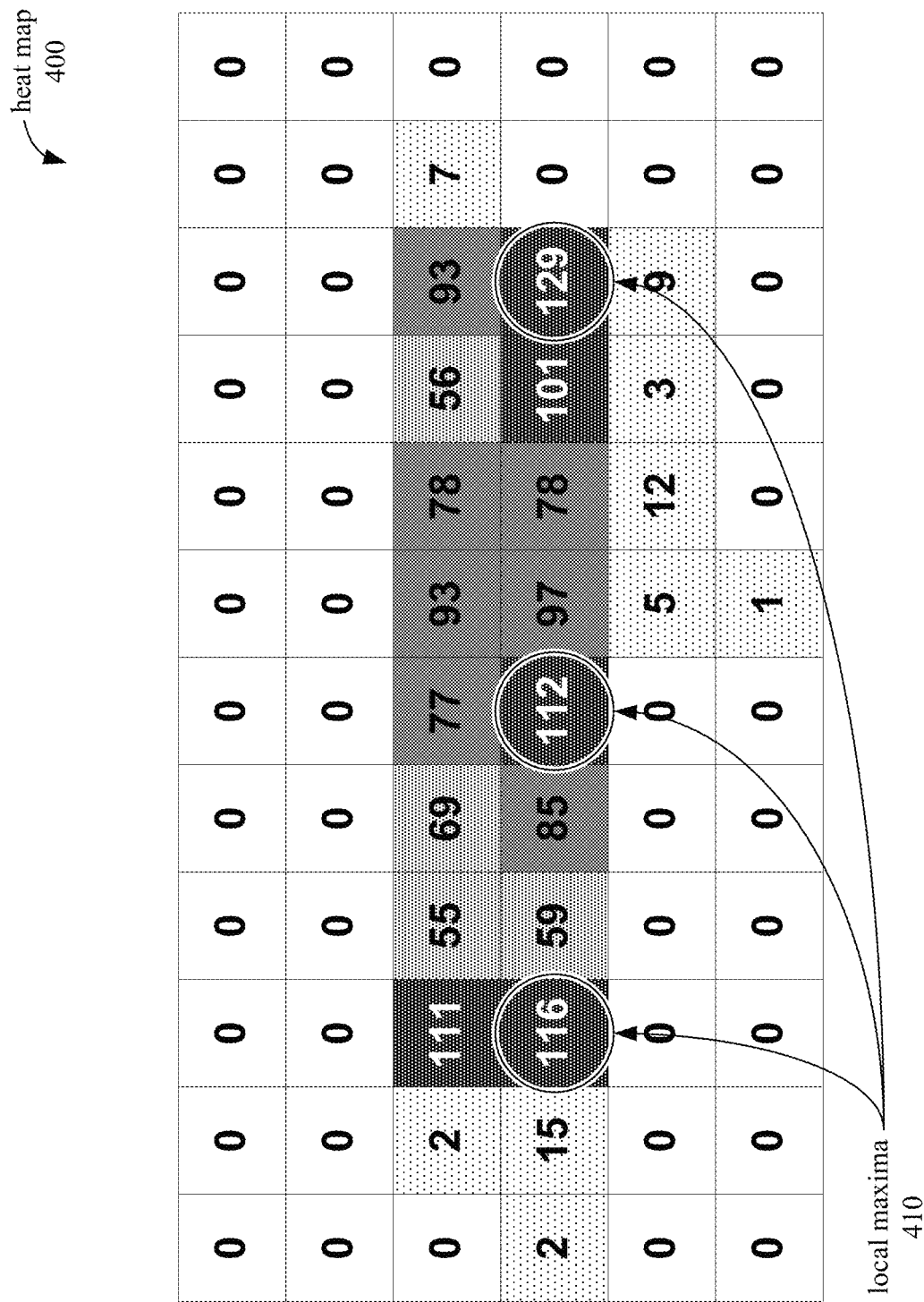
FIG. 4 illustrates a heat map of signal levels acquired from a scan of a touch-sensing surface, according to one embodiment.

FIG. 4 illustrates a "heat map" 400 including signal levels detected by unit cells of a touch-sensing surface, according to one embodiment. In one embodiment, each unit cell may be associated with an intersection between unique pairs of horizontal and vertical sensor elements, and the signal levels in the heat map 400 represent a difference between a count value measured at the corresponding intersection and a baseline count value for that intersection. FIG. 4 illustrates a particular case where four conductive objects are contacting the touch-sensing surface, resulting in the illustrated signal levels.

One embodiment method for calculating locations of the conductive objects at the touch-sensing surface may calculate centroids based on local maxima identified from among the signal levels. Such a process may detect only three local maxima 410 from the signal levels in heat map 400, despite the presence of four conductive objects at the touch-sensing surface. Thus, when touches are close together, some touches may be lost.

Figure 5A:
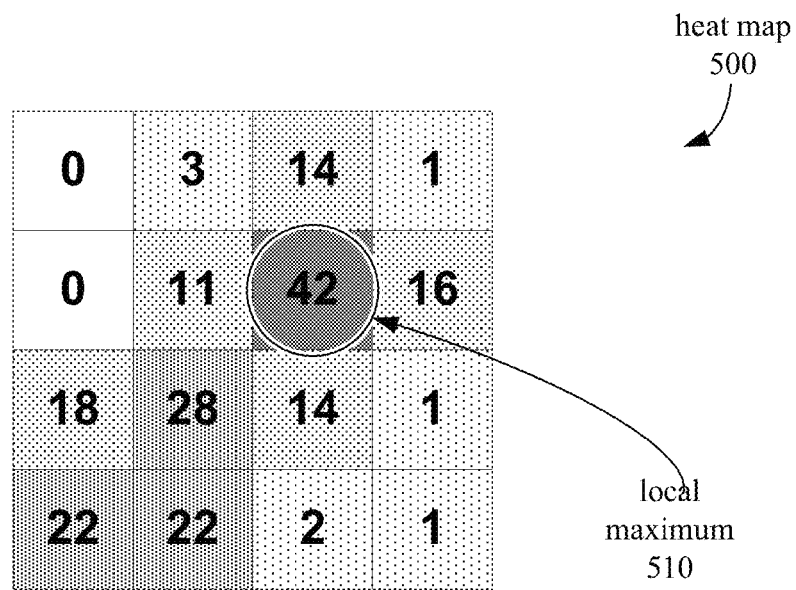
FIGS. 5A and 5B illustrate a heat map of signal levels from a scan of a touch-sensing surface and a corresponding location of a resulting touch, respectively, according to one embodiment.
Figure 5B:
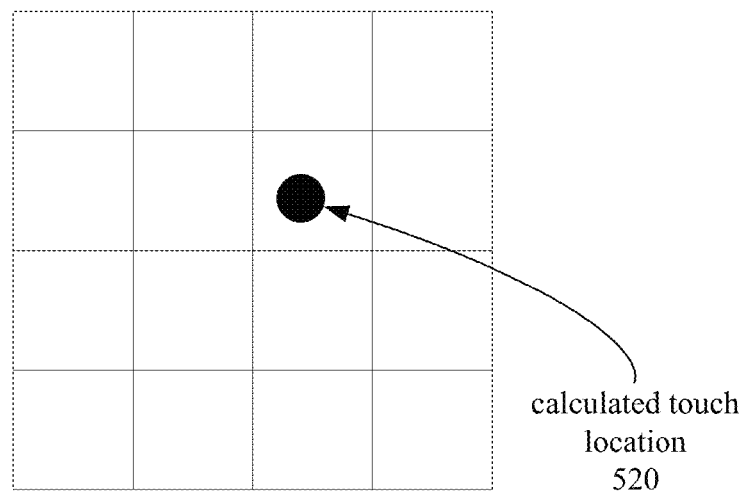

FIGS. 5A and 5B illustrate a heat map 500 resulting from two diagonally close touches at the touch-sensing surface and the corresponding touch location calculated using a standard local maxima detection method, respectively. For the heat map 500, the distance between the two touches is less than three times the sensor pitch; thus, the local maxima detection method detects only local maximum 510. This is interpreted as a single contact at the calculated touch location 520.

Figure 6A:
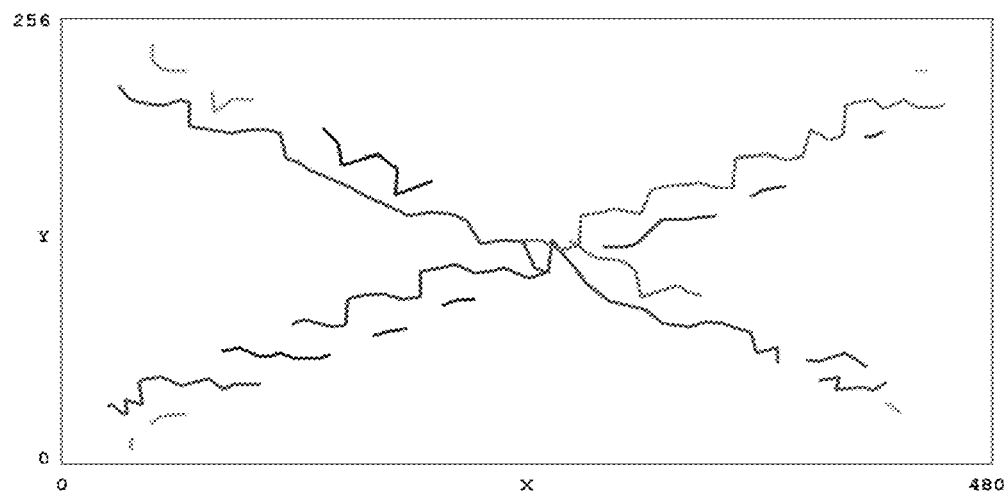
FIGS. 6A and 6B illustrate paths of conductive objects as tracked across a touch-sensing surface, according to one embodiment.
Figure 6B:
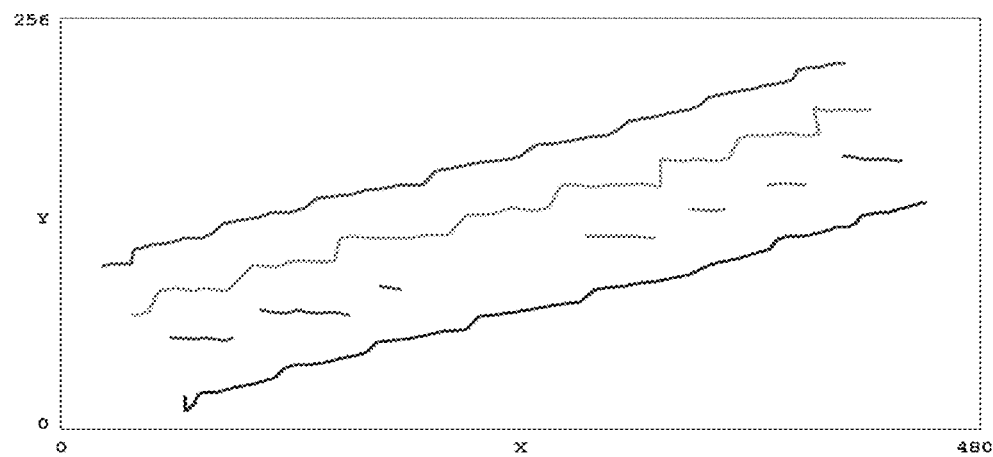

FIG. 6A illustrates paths of two diagonally close conductive objects as tracked using an embodiment of a standard local maxima detection method. As illustrated in FIG. 6A, the smoothness and continuity of the paths are degraded as a result of the close touch condition. FIG. 6B illustrates paths of four diagonally close conductive objects as tracked using an embodiment of a standard local maxima detection method. The paths as illustrated in FIG. 6B also suffer breaks in continuity and degraded linearity due to the closeness of the touches.

Figure 7:
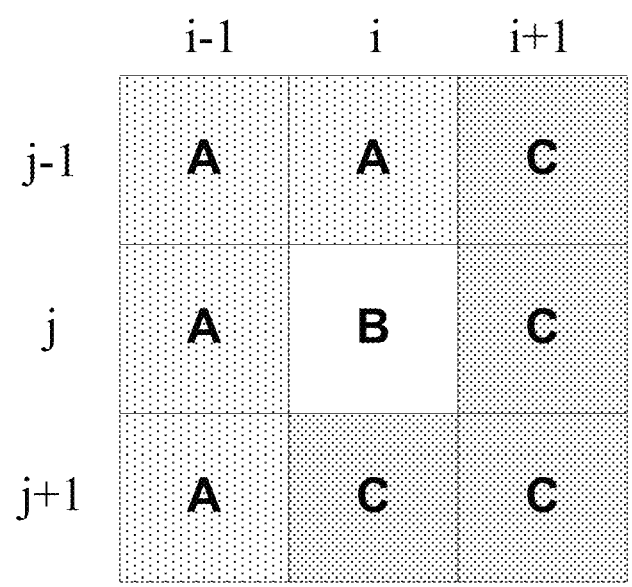
FIG. 7 illustrates a map of unit cells for a local maxima detection process, according to one embodiment.

In one embodiment, a standard local maxima detection process may determine that a signal level B is a local maxima if A<B≥C, according to the diagram in FIG. 7. In FIG. 7, i and j represent indexes of column and row sensor elements. Thus, the signal level B is at the center of a 9×9 grid of unit cells corresponding to the intersections between sensor elements j−1, j, and j+1 and column sensor element i−1, i, and i+1.

Figures 8A, 8B:
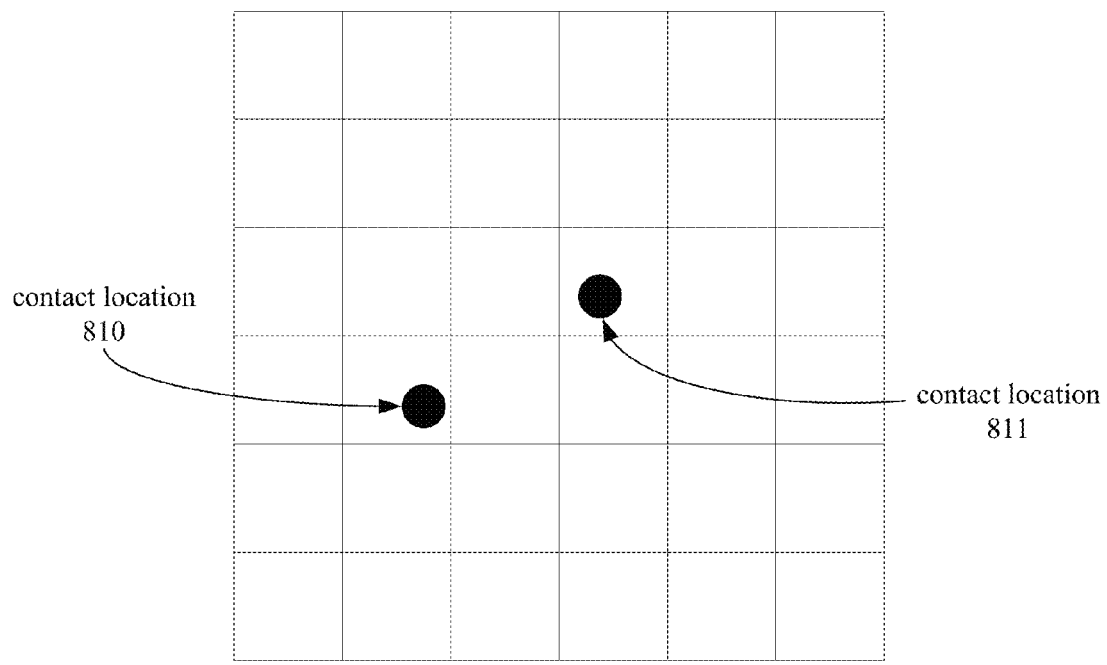
FIGS. 8A and 8B illustrate a heat map of signal levels from a scan of a touch-sensing surface and corresponding locations of the resulting touches, respectively, according to one embodiment.

FIG. 8A illustrates a set of signal levels resulting from two conductive objects contacting the touch-sensing surface, according to an embodiment. For example, the signal levels in FIG. 8A may be caused by two 7 mm diameter conductive objects separated by a 3.5 mm gap between edges. The local maxima are detected at the unit cells having signal levels 39 and 46; these unit cells correspond to the "B" unit cell in FIG. 7.

FIG. 8B illustrates the resulting detected touch locations when the standard local maxima detection process is used with the signal levels of FIG. 8A. Here, the signal levels are accurately interpreted as two separate touches at contact locations 810 and 811.

Figures 9A, 9B:
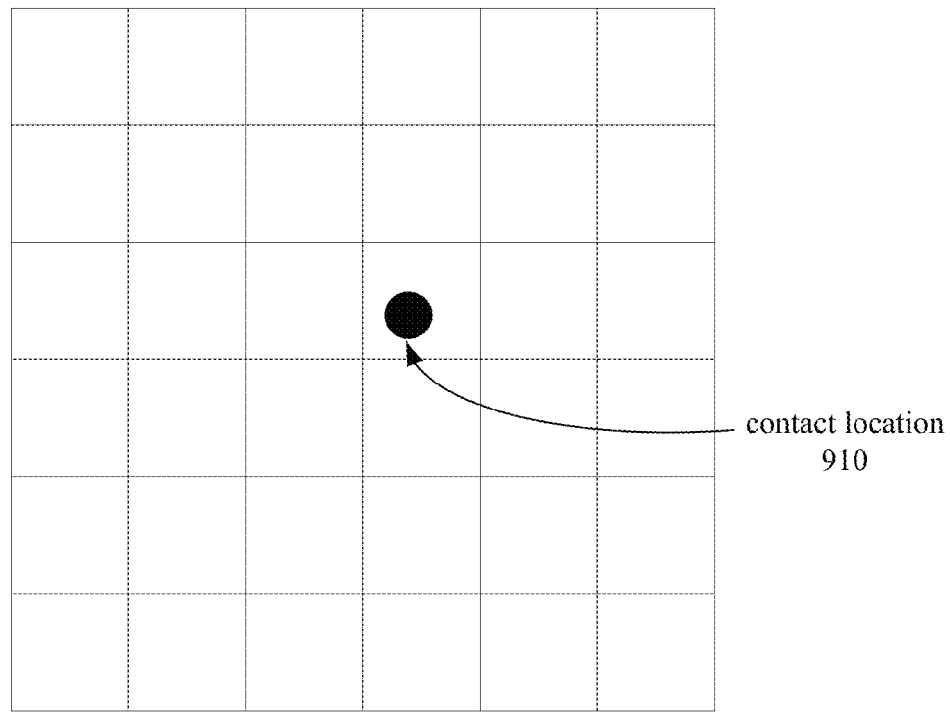
FIGS. 9A and 9B illustrate a heat map of signal levels from a scan of a touch-sensing surface and a corresponding location of a resulting touch, respectively, according to one embodiment.

FIG. 9A illustrates a set of signal levels resulting from two close touches at the touch-sensing surface. Here, the standard local maxima detection method detects one conductive object instead of two. FIG. 9B illustrates the contact location 910 that is detected based on the signal levels illustrated in FIG. 9A.

Figures 10A, 10B:
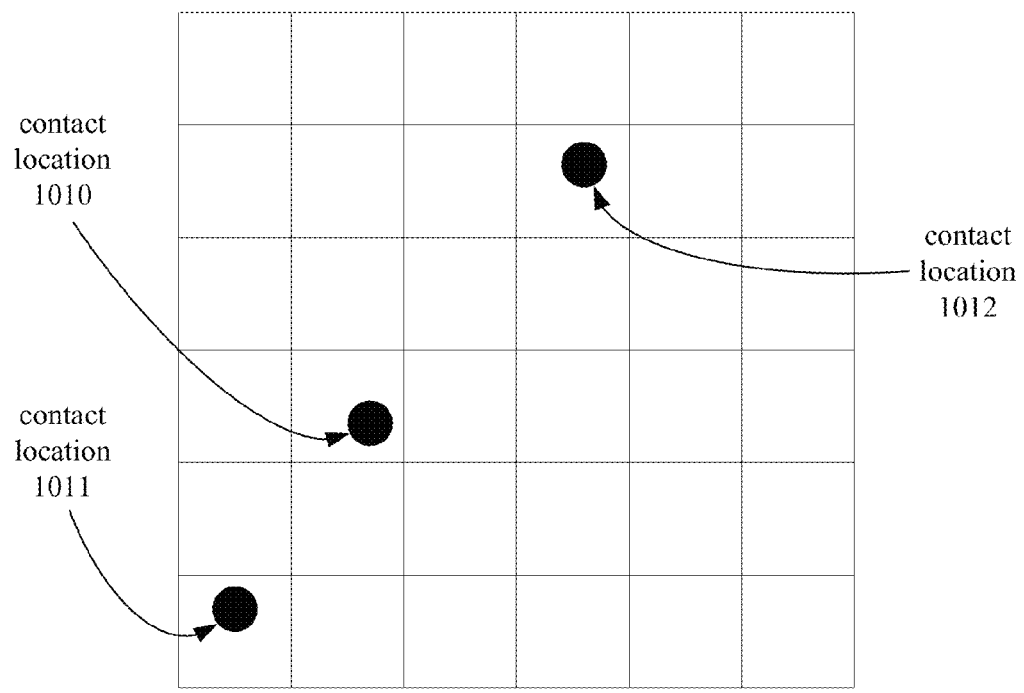
FIGS. 10A and 10B illustrate a heat map of signal levels from a scan of a touch-sensing surface and corresponding locations of the resulting touches, respectively, according to one embodiment.

FIG. 10A illustrates signal levels resulting from three conductive objects at the touch-sensing surface, where the conductive objects are sufficiently spaced apart so that the standard local maxima detection method accurately reports all three touch locations. Here, the detected local maxima have the values 31, 32, and 41. FIG. 10B shows the corresponding contact locations 1011, 1010, and 1012, respectively.

Figures 11A, 11B:
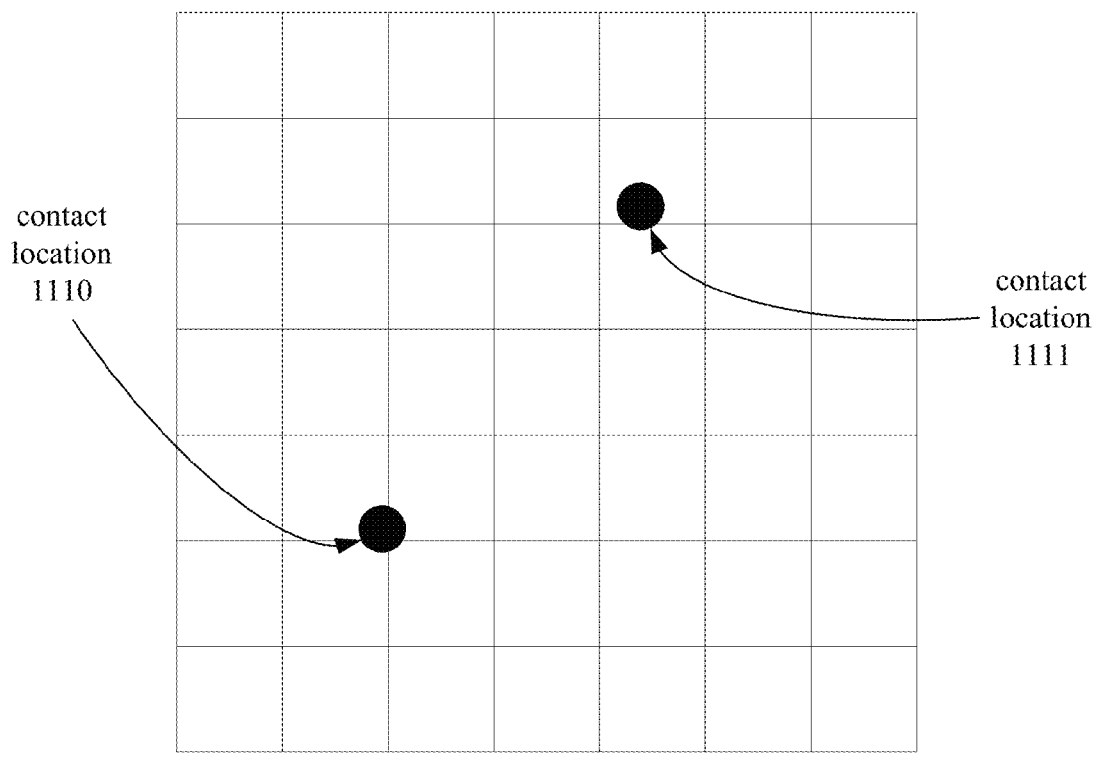
FIGS. 11A and 11B illustrate a heat map of signal levels from a scan of a touch-sensing surface and corresponding locations of the resulting touches, respectively, according to one embodiment.

FIG. 11A illustrates signal levels resulting from three conductive objects at the touch-sensing surface, where two of the touches are close together. Here, the standard local maxima detection method only detects the signal levels 32 and 41 as local maxima, resulting in the contact locations 1110 and 1111, as illustrated in FIG. 11B.

In one embodiment, a method for accurately locating and tracking close touches at a touch-sensing system may identify unit cells associated with the local maxima in a set of signal levels, then analyze the signal levels of unit cells surrounding the unit cells of the local maxima. In one embodiment, a lost touch may be identified based on analysis of unit cells that are a specific number of unit cells (such as two unit cells) away from the unit cells where the local maxima are detected.

In one embodiment, a close touch tracking method may maintain a list of local maxima that potentially correspond to actual touches, then remove local maxima from the list that are attributable to other touches.

Figure 1:
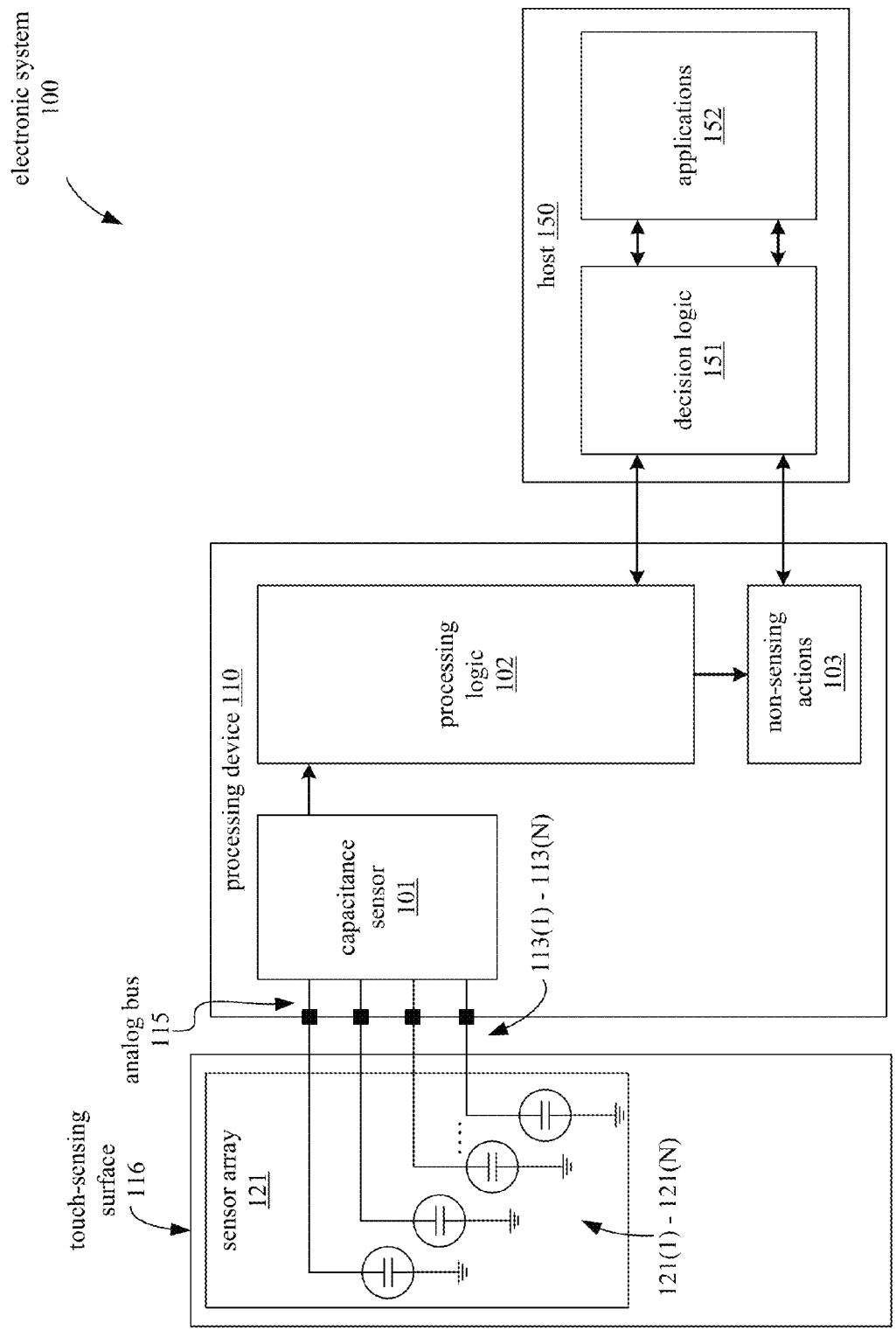
FIG. 1 is a block diagram illustrating an embodiment of an electronic system that processes touch sensor data.

FIG. 1 illustrates a block diagram of one embodiment of an electronic system 100 including a processing device 110 that may be configured to measure capacitances from a touch sensing surface 116 including a capacitive touch sensor pattern as described above. The electronic system 100 includes a touch-sensing surface 116 (e.g., a touchscreen, or a touch pad) coupled to the processing device 110 and a host 150. In one embodiment, the touch-sensing surface 116 is a two-dimensional user interface that uses a sensor array 121 to detect touches on the surface 116.

In one embodiment, the sensor array 121 includes sensor elements 121(1)-121(N) (where N is a positive integer) that are disposed as a two-dimensional matrix (also referred to as an XY matrix). The sensor array 121 is coupled to pins 113(1)-113(N) of the processing device 110 via one or more analog buses 115 transporting multiple signals. In this embodiment, each sensor element 121(1)-121(N) is represented as a capacitor.

In one embodiment, the capacitance sensor 101 may include a relaxation oscillator or other means to convert a capacitance into a measured value. The capacitance sensor 101 may also include a counter or timer to measure the oscillator output. The processing device 110 may further include software components to convert the count value (e.g., capacitance value) into a sensor element detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the output, instead of the raw counts being over or under a certain threshold.

In one embodiment, the processing device 110 further includes processing logic 102. Operations of the processing logic 102 may be implemented in firmware; alternatively, it may be implemented in hardware or software. The processing logic 102 may receive signals from the capacitance sensor 101, and determine the state of the sensor array 121, such as whether an object (e.g., a finger) is detected on or in proximity to the sensor array 121 (e.g., determining the presence of the object), where the object is detected on the sensor array (e.g., determining the location of the object), tracking the motion of the object, or other information related to an object detected at the touch sensor.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sensor array 121 (e.g., keyboard, keypad, mouse, trackball, LEDs, displays, or other peripheral devices).

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, the processing device 110 may be the Programmable System on a Chip (PSoC™) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

In one embodiment, the electronic system 100 is implemented in a device that includes the touch-sensing surface 116 as the user interface, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 100 may be used in other types of devices. It should be noted that the components of electronic system 100 may include all the components described above. Alternatively, electronic system 100 may include only some of the components described above, or include additional components not listed herein.

Figure 2:
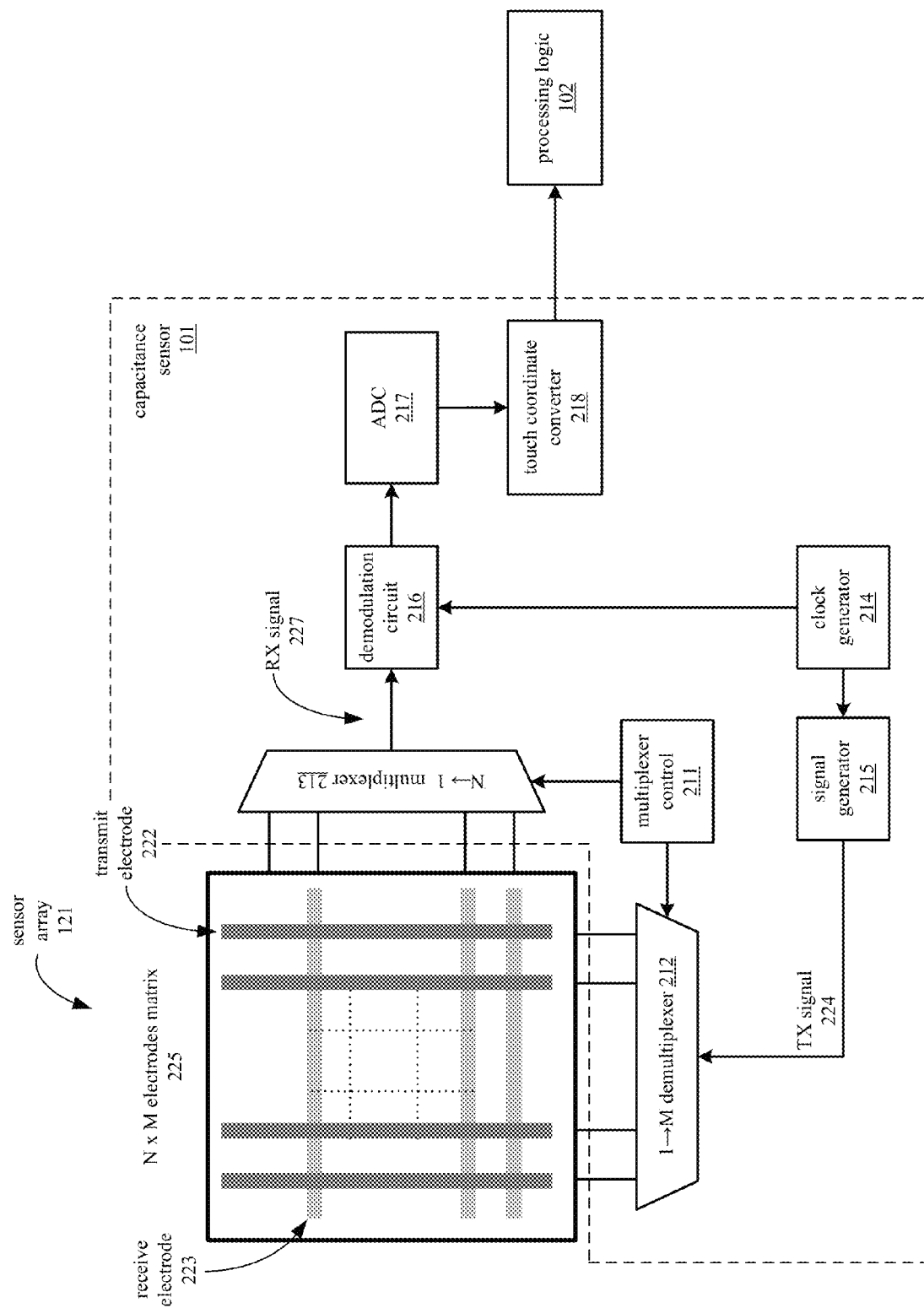
FIG. 2 is a block diagram illustrating an embodiment of an electronic system that processes touch sensor data.

FIG. 2 is a block diagram illustrating one embodiment of a capacitive touch sensor array 121 and a capacitance sensor 101 that converts changes in measured capacitances to coordinates indicating the presence and location of touch. The coordinates are calculated based on changes in measured capacitances relative to the capacitances of the same touch sensor array 121 in an un-touched state. In one embodiment, sensor array 121 and capacitance sensor 101 are implemented in a system such as electronic system 100. Sensor array 220 includes a matrix 225 of N×M electrodes (N receive electrodes and M transmit electrodes), which further includes transmit (TX) electrode 222 and receive (RX) electrode 223. Each of the electrodes in matrix 225 is connected with capacitance sensing circuit 201 through demultiplexer 212 and multiplexer 213.

Capacitance sensor 101 includes multiplexer control 211, demultiplexer 212 and multiplexer 213, clock generator 214, signal generator 215, demodulation circuit 216, and analog to digital converter (ADC) 217. ADC 217 is further coupled with touch coordinate converter 218. Touch coordinate converter 218 may be implemented in the processing logic 102.

The transmit and receive electrodes in the electrode matrix 225 may be arranged so that each of the transmit electrodes overlap and cross each of the receive electrodes such as to form an array of intersections, while maintaining galvanic isolation from each other. Thus, each transmit electrode may be capacitively coupled with each of the receive electrodes. For example, transmit electrode 222 is capacitively coupled with receive electrode 223 at the point where transmit electrode 222 and receive electrode 223 overlap.

Clock generator 214 supplies a clock signal to signal generator 215, which produces a TX signal 224 to be supplied to the transmit electrodes of touch sensor 121. In one embodiment, the signal generator 215 includes a set of switches that operate according to the clock signal from clock generator 214. The switches may generate a TX signal 224 by periodically connecting the output of signal generator 215 to a first voltage and then to a second voltage, wherein said first and second voltages are different.

The output of signal generator 215 is connected with demultiplexer 212, which allows the TX signal 224 to be applied to any of the M transmit electrodes of touch sensor 121. In one embodiment, multiplexer control 211 controls demultiplexer 212 so that the TX signal 224 is applied to each transmit electrode 222 in a controlled sequence. Demultiplexer 212 may also be used to ground, float, or connect an alternate signal to the other transmit electrodes to which the TX signal 224 is not currently being applied. In an alternate embodiment the TX signal 224 may be presented in a true form to a subset of the transmit electrodes 222 and in complement form to a second subset of the transmit electrodes 222, wherein there is no overlap in members of the first and second subset of transmit electrodes 222.

Because of the capacitive coupling between the transmit and receive electrodes, the TX signal 224 applied to each transmit electrode induces a current within each of the receive electrodes. For instance, when the TX signal 224 is applied to transmit electrode 222 through demultiplexer 212, the TX signal 224 induces an RX signal 227 on the receive electrodes in matrix 225. The RX signal 227 on each of the receive electrodes can then be measured in sequence by using multiplexer 213 to connect each of the N receive electrodes to demodulation circuit 216 in sequence.

The mutual capacitance associated with each intersection between a TX electrode and an RX electrode can be sensed by selecting every available combination of TX electrode and an RX electrode using demultiplexer 212 and multiplexer 213. To improve performance, multiplexer 213 may also be segmented to allow more than one of the receive electrodes in matrix 225 to be routed to additional demodulation circuits 216. In an optimized configuration, wherein there is a 1-to-1 correspondence of instances of demodulation circuit 216 with receive electrodes, multiplexer 213 may not be present in the system.

When an object, such as a finger, approaches the electrode matrix 225, the object causes a decrease in the measured mutual capacitance between only some of the electrodes. For example, if a finger is placed near the intersection of transmit electrode 222 and receive electrode 223, the presence of the finger will decrease the charge coupled between electrodes 222 and 223. Thus, the location of the finger on the touchpad can be determined by identifying the one or more receive electrodes having a decrease in measured mutual capacitance in addition to identifying the transmit electrode to which the TX signal 224 was applied at the time the decrease in capacitance was measured on the one or more receive electrodes.

By determining the mutual capacitances associated with each intersection of electrodes in the matrix 225, the presence and locations of one or more conductive objects may be determined. The determination may be sequential, in parallel, or may occur more frequently at commonly used electrodes.

In alternative embodiments, other methods for detecting the presence of a finger or other conductive object may be used where the finger or conductive object causes an increase in measured capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined based on the locations of one or more electrodes at which a change in measured capacitance is detected.

The induced current signal 227 is integrated by demodulation circuit 216. The rectified current output by demodulation circuit 216 can then be filtered and converted to a digital code by ADC 217.

A series of such digital codes measured from adjacent sensor or intersections may be converted to touch coordinates indicating a position of an input on touch sensor array 121 by touch coordinate converter 218. The touch coordinates may then be used to detect gestures or perform other functions by the processing logic 102.

In one embodiment, the capacitance sensor 101 can be configured to detect multiple touches. One technique for the detection and location resolution of multiple touches uses a two-axis implementation: one axis to support rows and another axis to support columns. Additional axes, such as a diagonal axis, implemented on the surface using additional layers, can allow resolution of additional touches.

Figure 12:
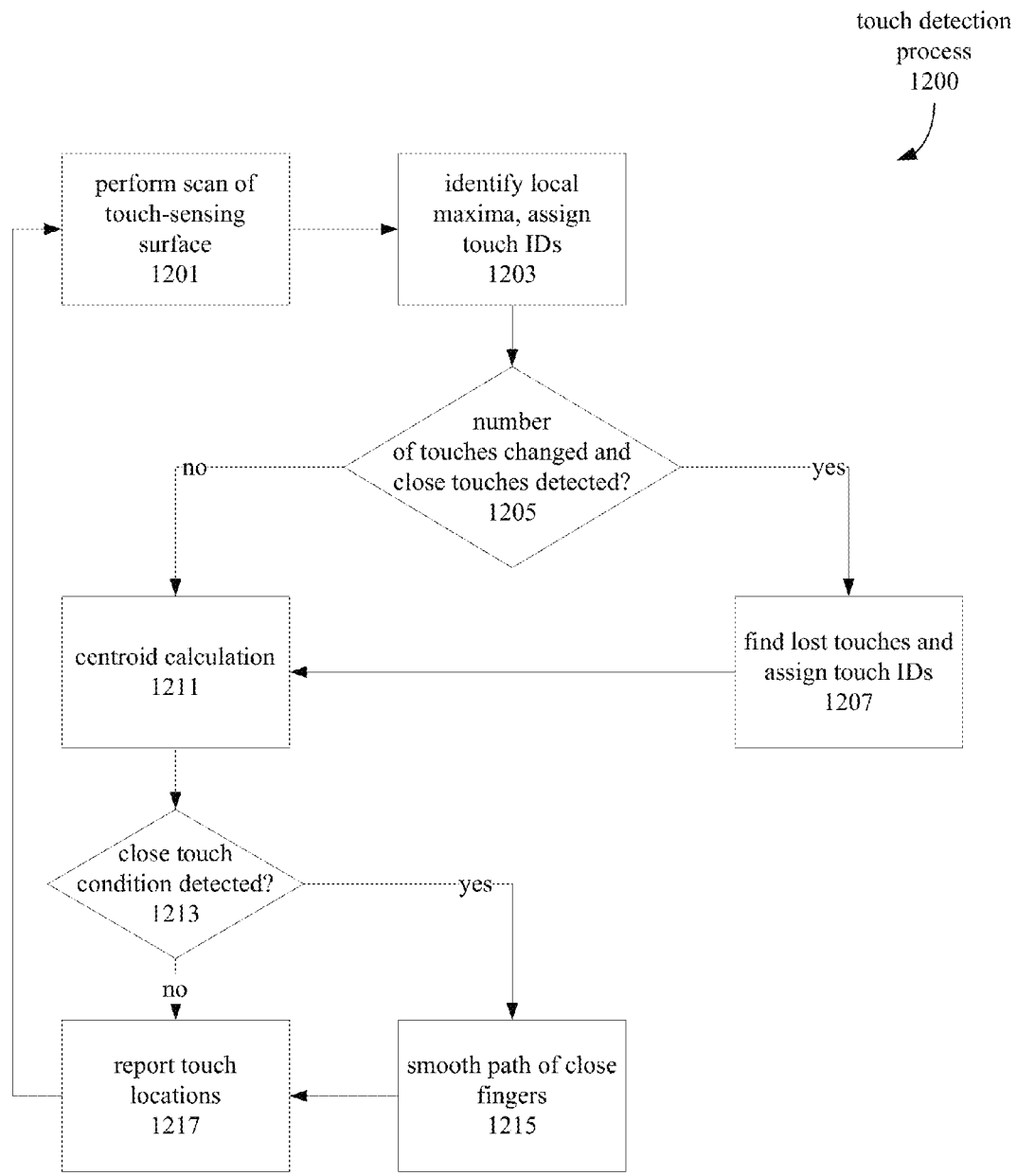
FIG. 12 is a flow diagram illustrating an embodiment of a touch detection process.

FIG. 12 is a flow diagram illustrating a process 1200 for detecting contacts at a touch-sensing surface such as touch-sensing surface 116, according to one embodiment. In one embodiment, the operations of process 1200 may be performed by a processing device such as processing device 110. Alternatively, the process 1200 may be performed in the host 150, or the operations of process 1200 may be divided between the host 150 and processing device 110.

The touch detection process 1200 begins at block 1201, where the processing device performs a scan of the touch-sensing surface. In one embodiment, the scan of the touch-sensing surface is performed by measuring a signal level from each unit cell of the touch-sensing surface. Each of the signal levels may be, for example, difference count values representing the difference between a measured count value and a baseline count value for the unit cell. From block 1201, the process 1200 continues at block 1203.

At block 1203, the processing device identifies local maxima from among the signal levels acquired at block 1201.

For example, the firmware within the processing device may identify local maxima by analyzing, for each unit cell, signal levels from the adjacent unit cells. In one embodiment, the process for identifying the local maxima may use the comparison A<B≥C, as previously described with reference to the diagram in FIG. 7.

In one embodiment, the touch-sensing system interprets a signal level as indicating a touch if the signal level exceeds a touch threshold. The processing device may also assign a touch ID to a location or unit cell associated with each of the local maxima. Thus, the process 1200 may continue at block 1205 upon detecting at least one local maxima that exceeds a touch threshold. In one embodiment, if the touch threshold is not exceeded, the touch-sensing surface may be scanned again.

At block 1205, the processing device evaluates whether the number of touches has changed from a previous scan of the touch-sensing surface. The number of local maxima detected at block 1203 that exceed the touch threshold may be interpreted as touches. The number of touches may be compared with an initial number of touches as determined by a previous scan of the touch-sensing surface, which may have been performed at block 1201 during a prior execution of the process 1200.

At block 1207, the processing device performs a process for finding lost touches and assigning touch IDs to the lost touches. In one embodiment, the processing device may determine a location of a lost touch based on signal levels associated with a subset of unit cells surrounding a unit cell where a local maximum was found.

Figure 13A:
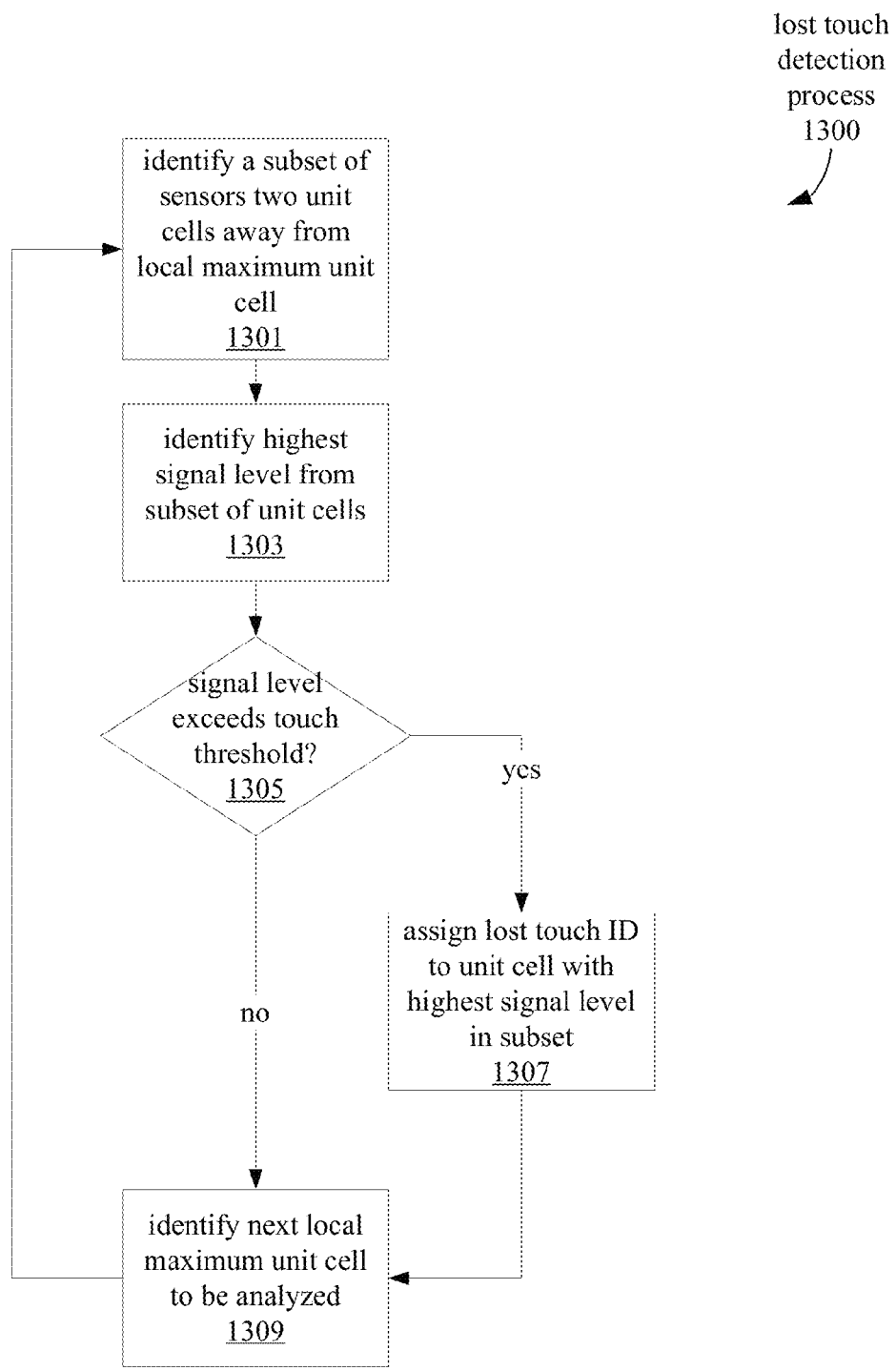
FIG. 13A is a flow diagram illustrating an embodiment of a process for detecting lost touches.

FIG. 13A illustrates an embodiment of a lost touch detection process 1300 that may be performed at block 1207. The lost touch detection process 1300 begins at block 1301. At block 1301, the processing device identifies a subset of unit cells associated with sensor elements that are two unit cells away from a unit cell where a local maximum was detected. In other words, the subset includes unit cells associated with sensor elements located in the range of 2 times the sensor pitch from the unit cell where the local maximum was detected. In an alternative embodiment, the range may be some other fixed distance greater or less than 2 times the sensor pitch. From block 1301, the process 1300 continues at block 1303.

At block 1303, the process 1300 identifies a second unit cell having a highest signal level from among the subset of unit cells. From block 1303, the process 1300 continues at block 1305.

At block 1305, the processing device evaluates whether the highest signal level identified at block 1303 exceeds the touch threshold. If the signal level exceeds the touch threshold, this unit cell having the highest signal level is treated as a lost touch, and the process 1300 continues at block 1307. Otherwise, the process 1300 continues at block 1309.

At block 1307, the processing device assigns a touch ID to the unit cell having the highest signal level, as determined at block 1303. In one embodiment, the processing device may choose a touch ID to assign depending on the locations of touch IDs from a previous scan. For example, a previous scan may detect a number of touches that may each be assigned a unique touch ID. The processing device may assign to the identified "lost touch" one of the touch IDs from the previous scan that was nearest the same location in the previous scan, or may assign a touch ID that was lost since the previous scan. From block 1307, the process 1300 continues at block 1309.

At block 1309, the processing device identifies the next unit cell at which a local maximum was detected. Execution of blocks 1301-1307 is then repeated using this next unit cell to locate any additional lost touches. In this way, the process 1300 may be repeated until it has been performed for all of the local maxima identified at block 1203 of process 1200.

Figure 13B:
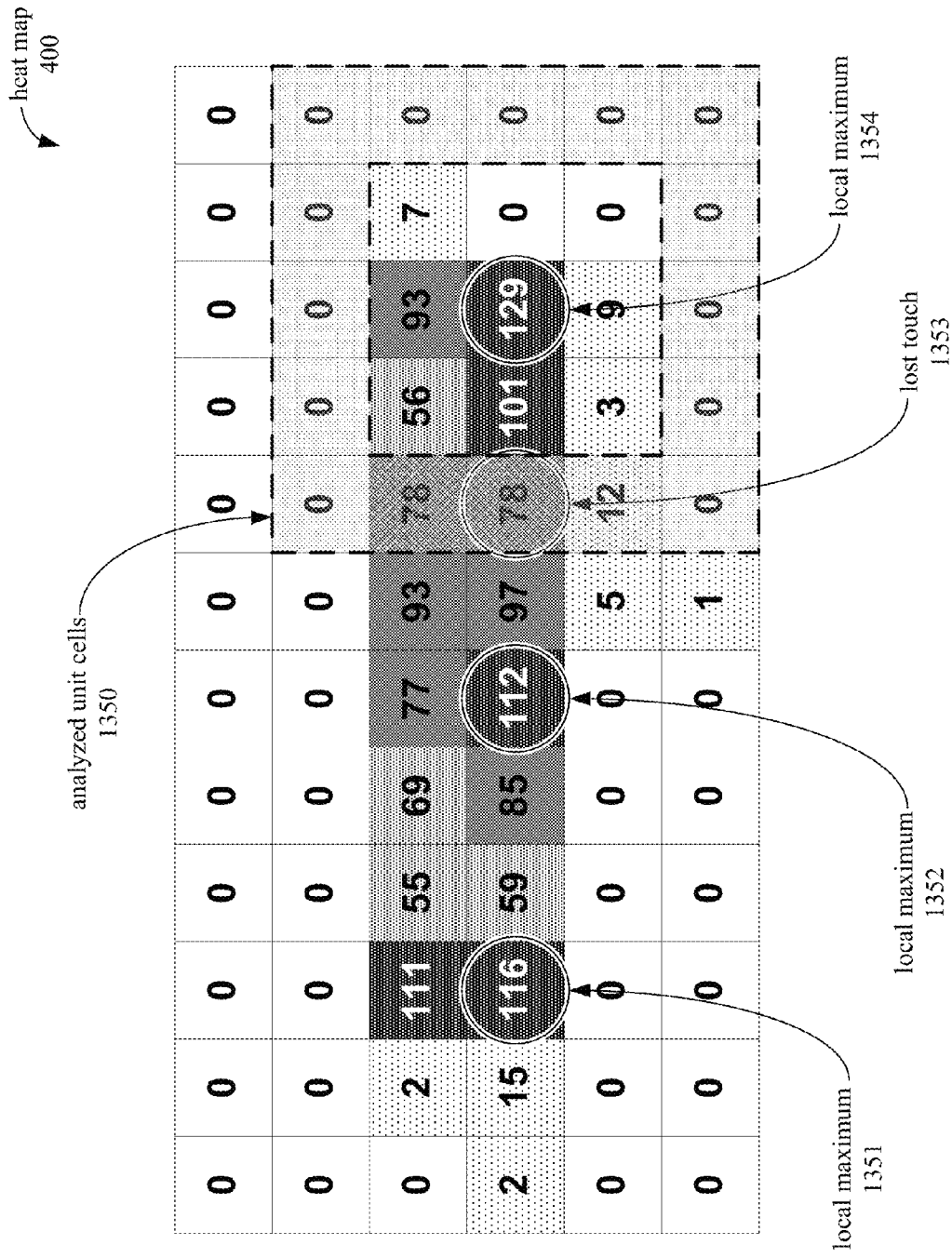
FIG. 13B illustrates a heat map of signal levels acquired from a scan of a touch-sensing surface, according to one embodiment.

FIG. 13B illustrates a heat map 400, also illustrated in FIG. 4, according to an embodiment. In FIG. 13B, the local maxima 1351, 1352, and 1354 are detected using the local maxima detection process, according to block 1203. In one embodiment, the local maxima 1351, 1352, and 1354 are detected using the process for identifying local maxima as described with reference to FIG. 7.

For heat map 400, a lost touch search process that analyzes sensor elements that are two elements away from the local maxima may identify a lost touch 1353. In one embodiment, the process may analyze unit cells 1350, which are associated with sensor elements that are two elements away from the local maximum 1354. Because the signal level 78 is the highest signal level among the unit cells 1350, the corresponding unit cell is identified as a location of a lost touch.

In one embodiment, when the subset of unit cells includes two or more signal levels that are equal, the process may select one based on the position of the unit cell relative to the central local maximum unit cell. For example, a closer unit cell may be selected as a lost touch over a unit cell having an equal signal level that is farther away from the central unit cell. Thus, the unit cell 1353 may be identified as the location of a lost touch instead of the unit cell directly above it, which also has a signal level of 78. From block 1207, the process 1200 continues at block 1209.

At block 1211, the processing device calculates a centroid for each of the touches, including the local maxima and the recovered lost touches. The centroid calculation process may calculate a centroid position based on the signal levels of unit cells around a unit cell at which a local maximum or lost touch is detected. In one embodiment, the calculated centroid locations may be used to track the movement of a touch over the course of several scans.

Figure 14A:
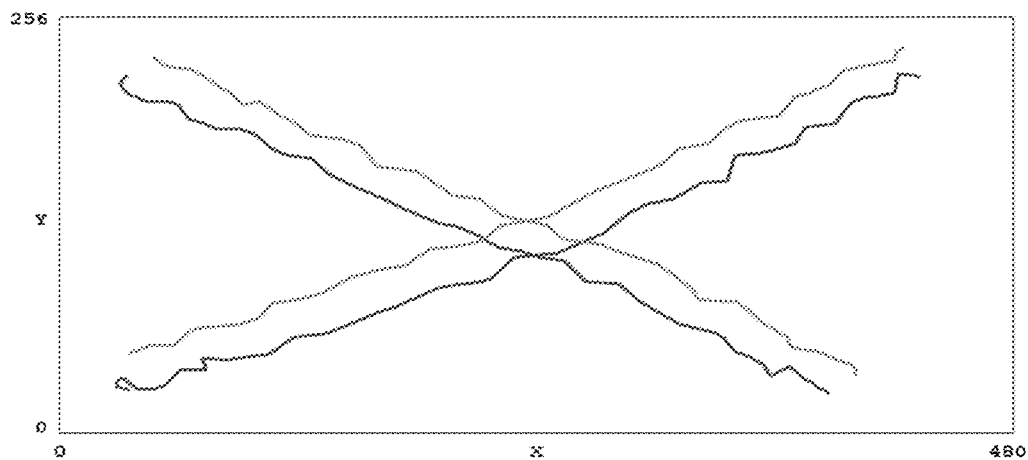
FIGS. 14A and 14B illustrate paths of conductive objects as tracked across a touch-sensing surface, according to one embodiment.
Figure 14B:
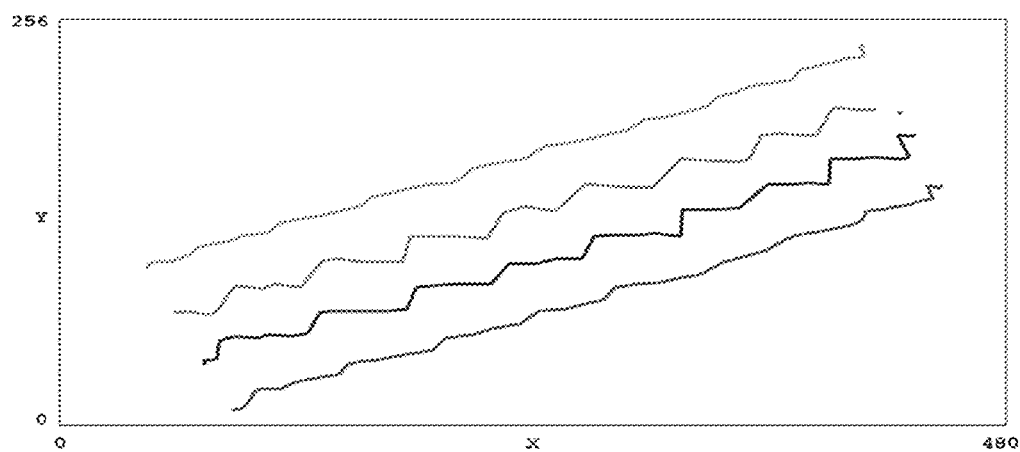

FIGS. 14A and 14B illustrate paths of conductive objects as tracked across a touch-sensing surface using a lost touch seeking process, according to one embodiment. FIG. 14A illustrates the paths of two close conductive objects moving along two diagonals of the touch-sensing surface. FIG. 14B illustrates the paths of four close conductive objects, such as fingers, moving together diagonally across the surface.

The conductive objects resulting in the paths of FIGS. 14A and 14B and the paths illustrated in FIGS. 6A and 6B, may be similar; however, the paths illustrated in FIGS. 14A and 14B more accurately represent the continuity of contact between the conductive objects and the touch-sensing surface as a result of identifying lost touches. Referring back to FIG. 12, the process 1200 continues at block 1213 from block 1211.

At block 1213, the processing device determines whether a close touch condition exists by comparing distance between the centroid locations of the touches with a close touch threshold. In one embodiment, the close touch threshold may be three times the sensor pitch, such that a close touch condition is detected if a distance between any pair of touches is less than three times the sensor pitch. In one embodiment, each of the touches that has another touch nearby may be flagged as a close touch. For example, a "CloseFinger" flag associated with each touch ID may be used to identify close touches.

In one embodiment, the process 1200 may check the "CloseFinger" flag upon the next execution of block 1205, such that the lost touch seeking operations 1207 are performed only when close touches are detected. From block 1213, if close touches are detected the process 1200 continues at block 1215. Otherwise, the process 1200 continues at block 1217, where the touch locations are reported to a host or other device.

At block 1215, the processing device may adjust the positions of the centroids calculated at block 1211 to smooth the paths of the conductive objects as they are tracked over the course of successive scans of the touch-sensing surface. In one embodiment, such a smoothing process may analyze the centroid locations to find a virtual center for a group of close touches.

Figure 15:
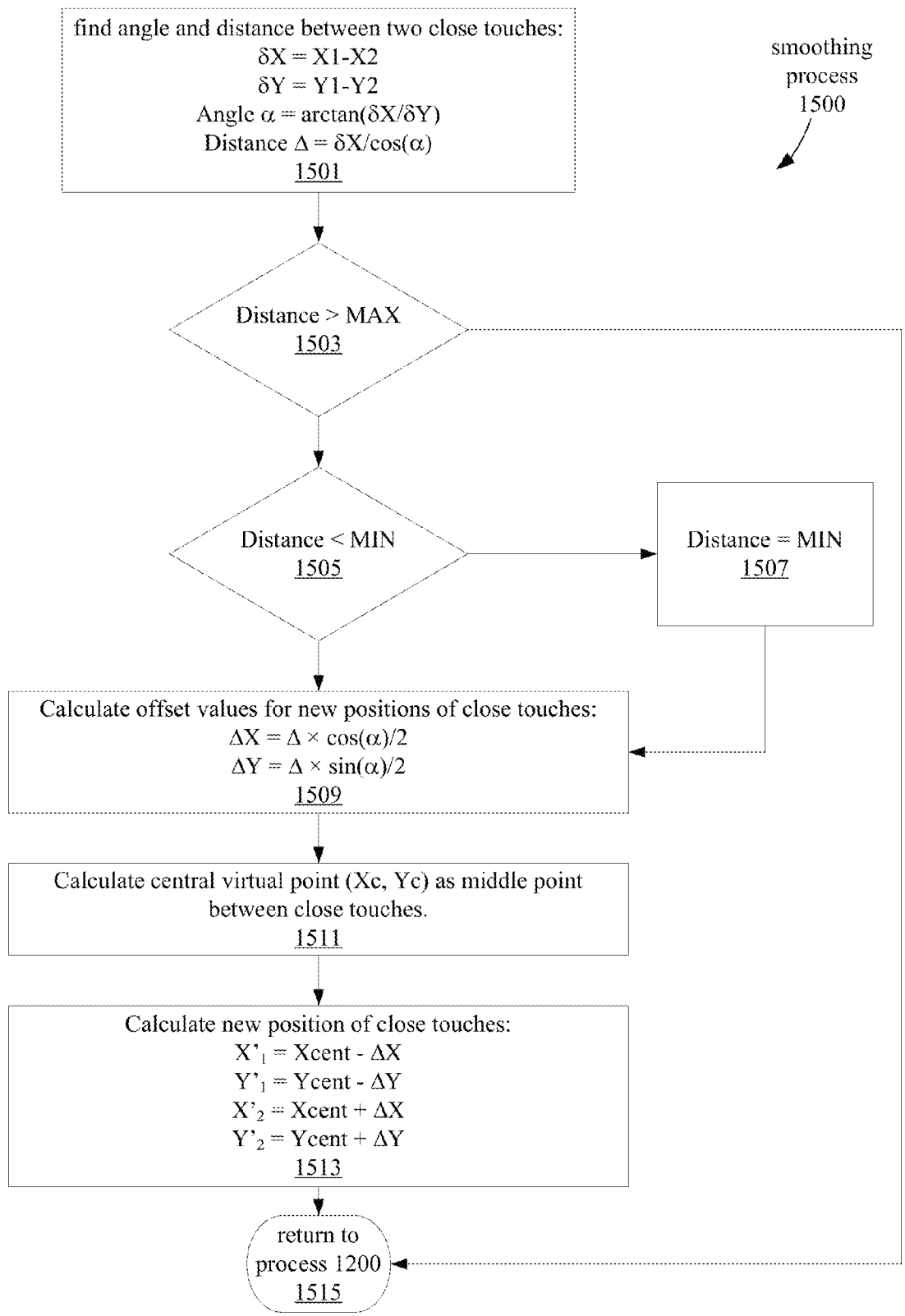
FIG. 15 is a flow diagram illustrating an embodiment of a process for smoothing paths of conductive objects as tracked across a touch-sensing surface.

FIG. 15 illustrates an embodiment of a smoothing process 1500 for smoothing the path of close touches in motion, as tracked by a touch-sensing surface.

In one embodiment, the process 1500 is used only when specific conditions are detected. In one embodiment, the process 1500 may be used only when close touches are detected at block 1213, or when the number of close touches is less than four. In one embodiment, the process 1500 may be invoked only when the distance between the most distant of the touches is less than a certain threshold.

In one embodiment, the process may use touch centroid positions as calculated by a centroid calculation process according to block 1211 of process 1200.

Figure 16A:
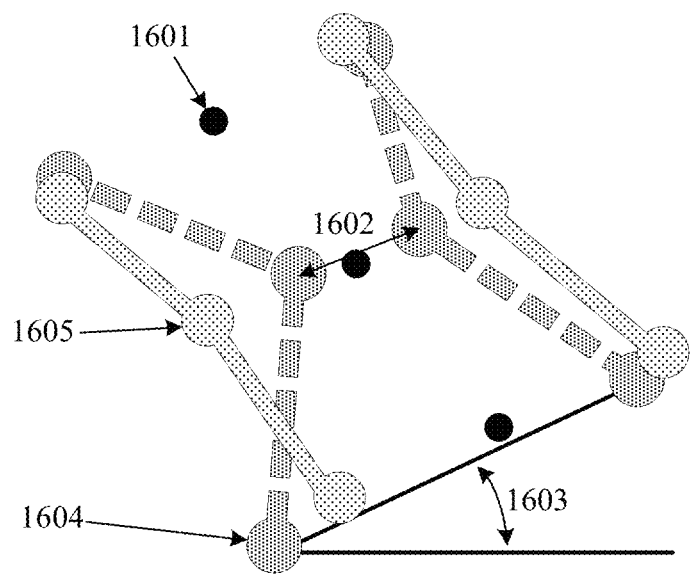
FIG. 16A illustrates paths of a pair of conductive objects as corrected by a smoothing process, according to one embodiment.

At block 1501, the process 1500 may calculate the distance between the centroid locations of close touches, along with their relative angle. FIG. 16A illustrates these parameters in further detail, according to one embodiment.

As illustrated in FIG. 16A, the dashed lines connect original centroid locations, such as location 1604. The distance 1602 designates a distance between two touch locations from the same scan and having different touch IDs. The angle 1603 designates an angle formed by a line segment between two touch locations having different touch IDs.

The distance Δ and angle α between two touch locations (X1, Y1) and (X2, Y2) are calculated using the following equations:

$$\delta X = X1 - X2 \quad \text{(Equation 1)}$$

$$\delta Y = Y1 - Y2 \quad \text{(Equation 2)}$$

$$\alpha = \arctan(\delta X/\delta Y) \quad \text{(Equation 3)}$$

$$\text{Distance} = \delta X/\cos(\alpha) \quad \text{(Equation 4)}$$

From block 1501, the process 1500 continues at block 1503.

At blocks 1503 and 1505, the distance is tested against a threshold distances MIN and MAX. In one embodiment, MIN (as seen in block 1507) represents a theoretical minimum distance between two touches at which the touch-sensing system can recognize two touches instead of one. In one embodiment, MIN is approximated according to Equation 5 below, for the exemplary case of a sensor array having a sensor pitch of 16 pixels.

$$\text{Min2\_Dist} = \sqrt{16^2 + 16^2} \approx 23 \quad \text{(Equation 5)}$$

Thus, in one embodiment, the operation of blocks 1505 and 1507 set Δ according to Equation 6.

$$\Delta = \text{Min2\_Dist, if } \Delta < \text{Min2\_Dist} \quad \text{(Equation 6)}$$

If the distance is greater than MAX, the calculation of new positions is bypassed and the process 1500 continues to block 1515. From blocks 1505 and 1507, the process 1500 continues at block 1509.

At block 1509, the processing device may calculate offset values for the corrected positions of close touches according to the following Equations 7 and 8:

$$\Delta X = \Delta \times \cos(\alpha)/2 \quad \text{(Equation 7)}$$

$$\Delta Y = \Delta \times \sin(\alpha)/2 \quad \text{(Equation 8)}$$

Here, ΔX and ΔY represent the X and Y offsets of the corrected touch location relative to a virtual center between the two original touch locations. From block 1509, the process 1500 continues at block 1511.

At block 1511, the processing device calculates the location of the virtual center (Xc, Yc) as a middle point between two touch locations. In one embodiment, the method chosen for calculating the virtual center may depend on the number of close touches detected. In one embodiment, if two or three close touches are detected, a 5×5 or 7×7 centroid calculation process may be used to determine the virtual center.

If four touches are present, the virtual center may be the middle point between the two touches separated by the greatest distance. Alternatively, the four touch locations may be treated as two pairs of touches, and 5×5 centroid calculations may be performed on the pairs.

In one embodiment, the distance Δ between touches is calculated according to Equations 9 and 10 below.

$$\Delta = \frac{\delta \text{Max}}{\cos(\alpha)} \quad \text{(Equation 9)}$$

where $$\delta \text{Max} = \delta X, \text{ if } \delta X > \delta Y, \quad \text{(Equation 10)}$$
$$\delta \text{Max} = \delta Y, \text{ if } \delta X < \delta Y, \text{ and}$$
$$\alpha = \arctan\frac{\delta X}{\delta Y}$$

Figure 16B:
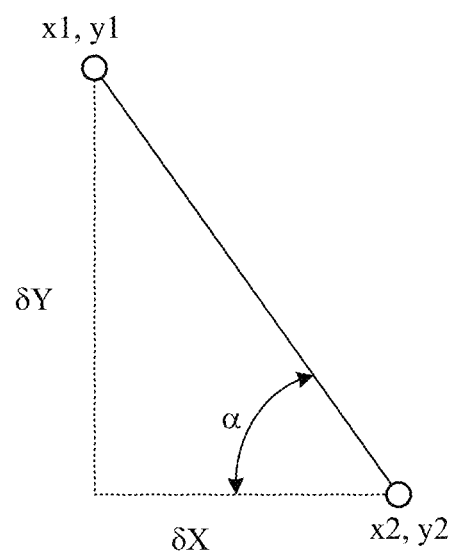
FIG. 16B illustrates parameters associated with a pair of touches, according to one embodiment.

FIG. 16B is a diagram further illustrating the distance Δ between two touches (x1, y1) and (x2, y2), angle α, and the components of distance Δ, δY and δX.

The corrected positions of the two touches $(X'_1, Y'_1)$ and $(X'_2, Y'_2)$ are calculated using the Equations 11 below.

$$X'_1 = X_{cent} \pm \Delta X$$

$$Y'_1 = Y_{cent} \pm \Delta Y$$

$$X'_2 = X_{cent} \mp \Delta X$$

$$Y'_2 = Y_{cent} \mp \Delta Y \quad \text{(Equation 11)}$$

where $$\Delta X = \Delta \times \cos(\alpha)$$

$$\Delta Y = \Delta \times \sin(\alpha)$$

Here, the ΔX and ΔY represent the distances along the X and Y axes, respectively, between the original touch positions and their corresponding corrected touch positions.

Figure 17A:
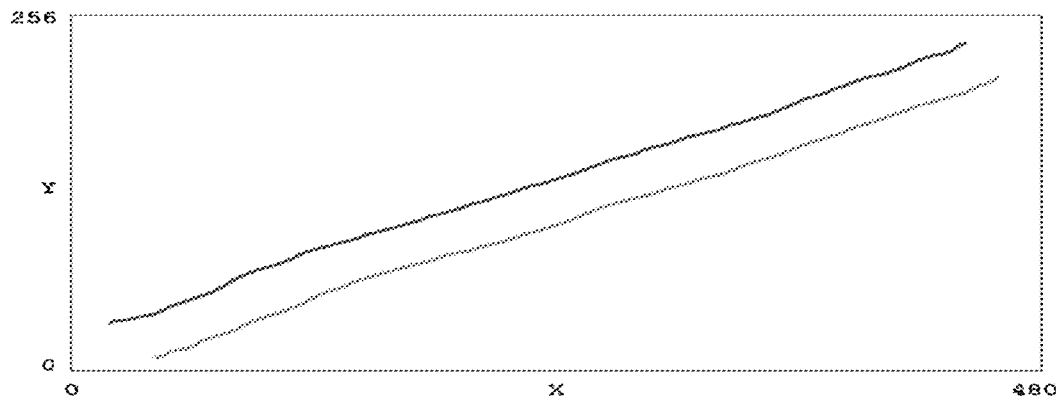
FIGS. 17A and 17B illustrate smoothed paths of conductive objects as tracked across a touch-sensing surface, according to one embodiment.
Figure 17B:
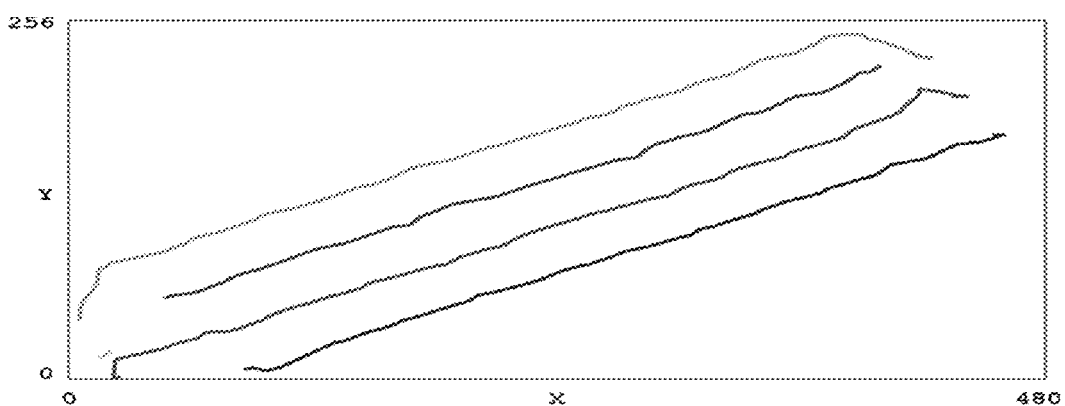

FIGS. 17A and 17B illustrate the paths of conductive objects in motions, as tracked across the touch-sensing surface and corrected according to process 1500. FIG. 17A illustrates paths of two 11 mm diameter conductive objects separated by a gap of 2 mm between edges. FIG. 17B illustrates the paths of four 8 mm diameter conductive objects separated by a gap of 3 mm between edges. From block 1513, the process 1500 continues at block 1515.

At block 1515, the process 1500 may return to process 1200, having performed path smoothing operations according to block 1215 of process 1200.

In one embodiment the distance Δ between the close touches may be corrected to further compensate for the "gravity" effect between close touches according to Equation 12 below.

$$\Delta' = \Delta * k \quad \text{(Equation 12)}$$

where $$k = \text{const} \times f\left(\frac{1}{\Delta}\right)$$

Here, $\Delta'$ represents the corrected value of $\Delta$, and const is a constant. In one embodiment, $f$ is a non-linear function that depends on the size and shape of the unit cells. In one embodiment, $f$ may be determined empirically. From block 1215, the process 1200 continues at block 1217.

At block 1217, the processing device the processing device may report the detected touch locations to a host, such as host 150 as illustrated in FIG. 1. From block 1217, the process 1200 continues back to block 1201. Thus, the process 1200 repeats over the course of sequential scans of the touch-sensing surface, allowing the touch-sensing surface to locate and track the movements of close touches.

Figure 18:
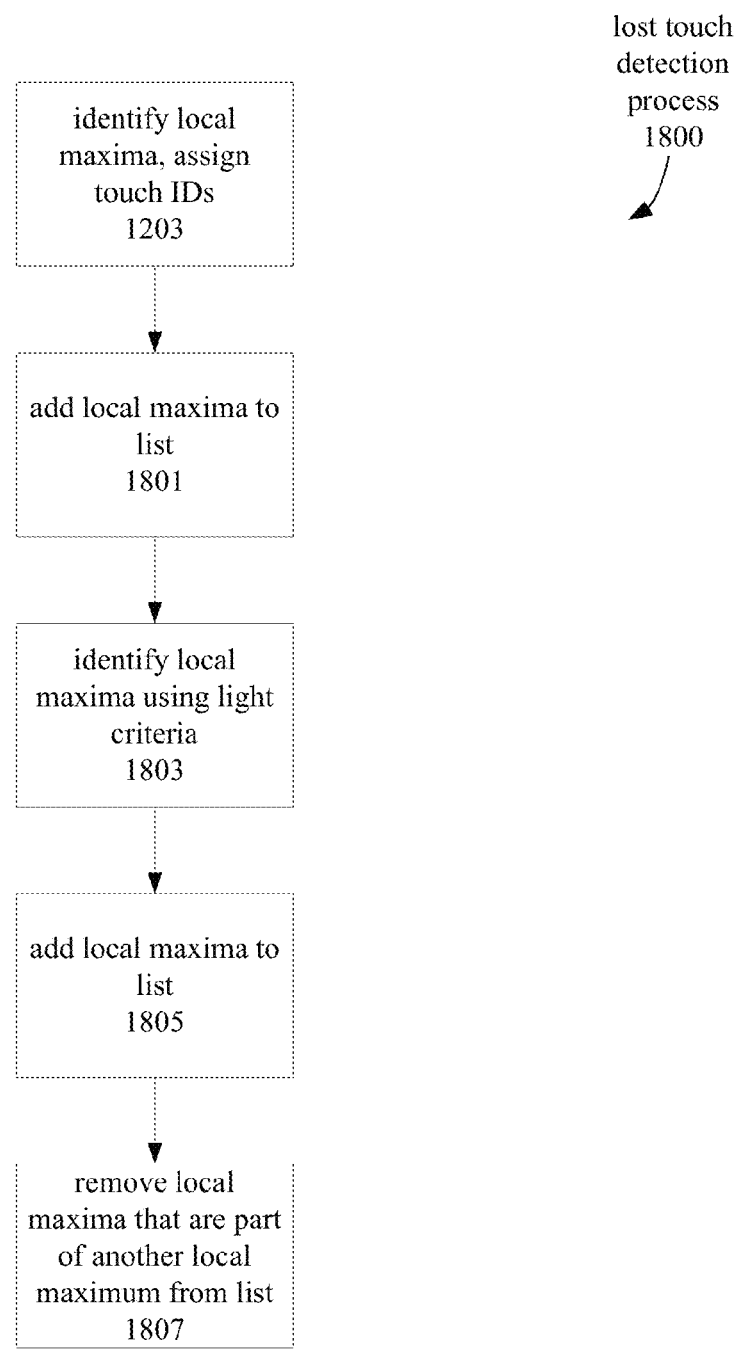
FIG. 18 lost touch detection process

FIG. 18 illustrates an alternate embodiment of a lost touch detection process 1800 that may be used when close touches are detected, for example, at block 1205. Process 1800 may be performed by a processing device such as processing device 110. In one embodiment, the operations of process 1800 may correspond to the operations of block 1207, as illustrated in FIG. 12.

At block 1203, also illustrated as part of process 1200, the processing device identifies local maxima from a set of signal levels acquired from a scan of the touch-sensing surface. The local maxima may then be added to a list of local maxima at block 1801. From block 1801, the process 1800 continues at block 1803.

At block 1803, the processing device identifies local maxima from the set of signal levels using an alternate set of "light" criteria. In one embodiment, the light version of the local maxima detection process may analyze fewer signal levels around the central unit cell than the standard version. For example, the processing device may compare the signal level from the central unit cell with signal levels of unit cells that are horizontally and vertically adjacent to the first unit cell, but omit signal levels of unit cells that are diagonally adjacent.

Figure 19:
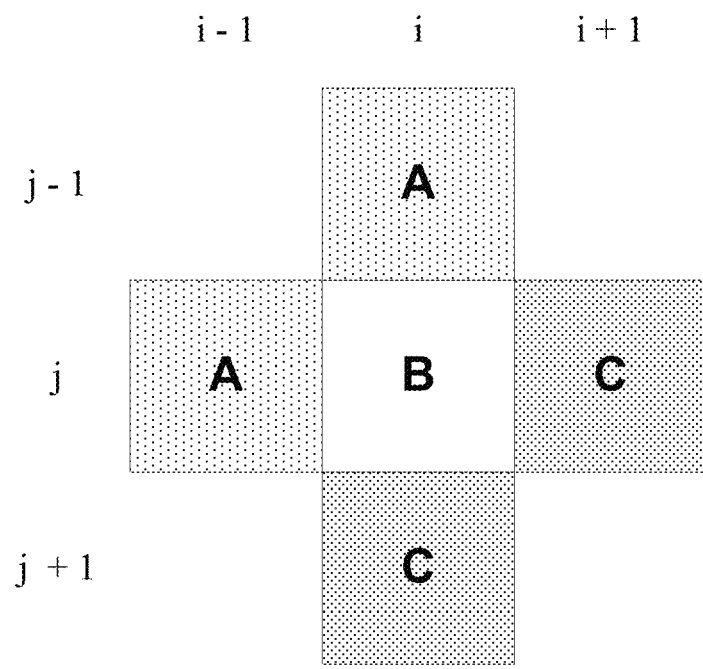
FIG. 19 illustrates a map of unit cells for a local maxima detection process, according to one embodiment.

This is illustrated in FIG. 19, according to one embodiment, for a central unit cell B at location (i, j). In one embodiment, the light local maxima detection process may analyze the unit cells A at locations (j, i−1), (i, j−1), and unit cells C at locations (j, i+1), (i, j+1) to test for the inequality expressed by Equation 13 below:

$$A < B \geq C \quad \text{(Equation 13)}$$

If the inequality of Equation 13 is evaluated as true, then B is interpreted as a local maximum by the light local maxima detection process.

Figures 20A, 20B:
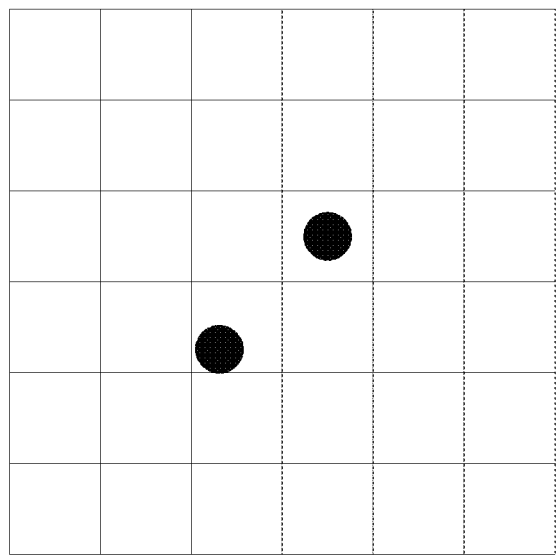
FIGS. 20A and 20B illustrate a heat map of signal levels from a scan of a touch-sensing surface and corresponding locations of the resulting touches, respectively, according to one embodiment

According to one embodiment, FIGS. 20A and 20B illustrate a set of signal levels from a scan of the touch-sensing surface and touch locations resulting from processing of the signal levels using the light local maxima detection process, respectively. With reference to FIG. 20A, the light local maxima detection process (as described with reference to FIG. 19) detects two local maxima at the unit cells having signal levels 28 and 42.

Figures 21A, 21B:
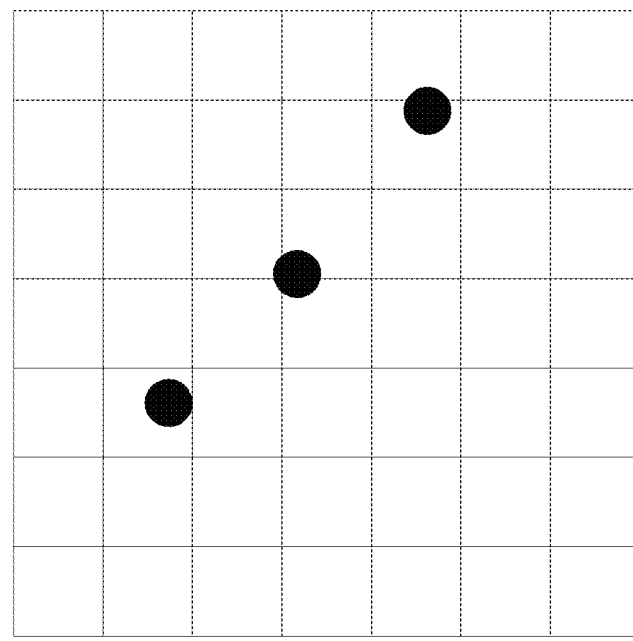
FIGS. 21A and 21B illustrate a heat map of signal levels from a scan of a touch-sensing surface and corresponding locations of the resulting touches, respectively, according to one embodiment

According to one embodiment, FIGS. 21A and 21B illustrate another set of signal levels from a scan of the touch-sensing surface and touch locations resulting from processing of the signal levels using the light local maxima detection process, respectively. With reference to FIG. 21A, the light local maxima detection process detects three local maxima at the unit cells having signal levels 30, 32, and 41.

From block 1803, the process 1800 continues at block 1805. At block 1805, the processing device may add the local maxima found using the light local maxima detection process at block 1803 to the list of local maxima. From block 1803, the process 1800 continues at block 1807.

At block 1807, the processing device removes local maxima that are part of another local maxima from the list of local maxima. In one embodiment, a local maximum may be identified as part of another local maximum if it is within a threshold distance from a unit cell corresponding to the other local maximum. In one embodiment, the threshold distance may be equal to the sensor pitch.

In one embodiment, the processing device identifies a local maximum to be ignored by analyzing each local maximum identified using the light local maxima detection process (block 1803) and determining whether it is within a threshold distance of a local maximum detected using the standard local maximum detection process (block 1203). If so, the processing device may then remove the analyzed local maximum from the list of local maxima.

In an alternative embodiment, the threshold distance may apply to the sensor elements, such that a local maximum (from block 1803) may be removed from the list if it is associated with a sensor element that is within the threshold distance from the other local maxima (from block 1203).

In one embodiment, a local maximum (from block 1803) may be considered part of another local maximum (from block 1203) if the unit cell where the local maximum (from block 1803) is found is within the set of unit cells analyzed when identifying the other local maximum (from block 1203) as a local maximum. For example, with reference to FIG. 7, the unit cells A and C may be considered part of the local maximum at unit cell B since the unit cells A and C were analyzed to determine that unit cell B is a local maximum.

In one embodiment, if any local maximum is detected that is a part of another local maxima, it is ignored by being removed from the list of local maxima. The removed local maxima are therefore not processed as touches.

Figures 22A, 22B:
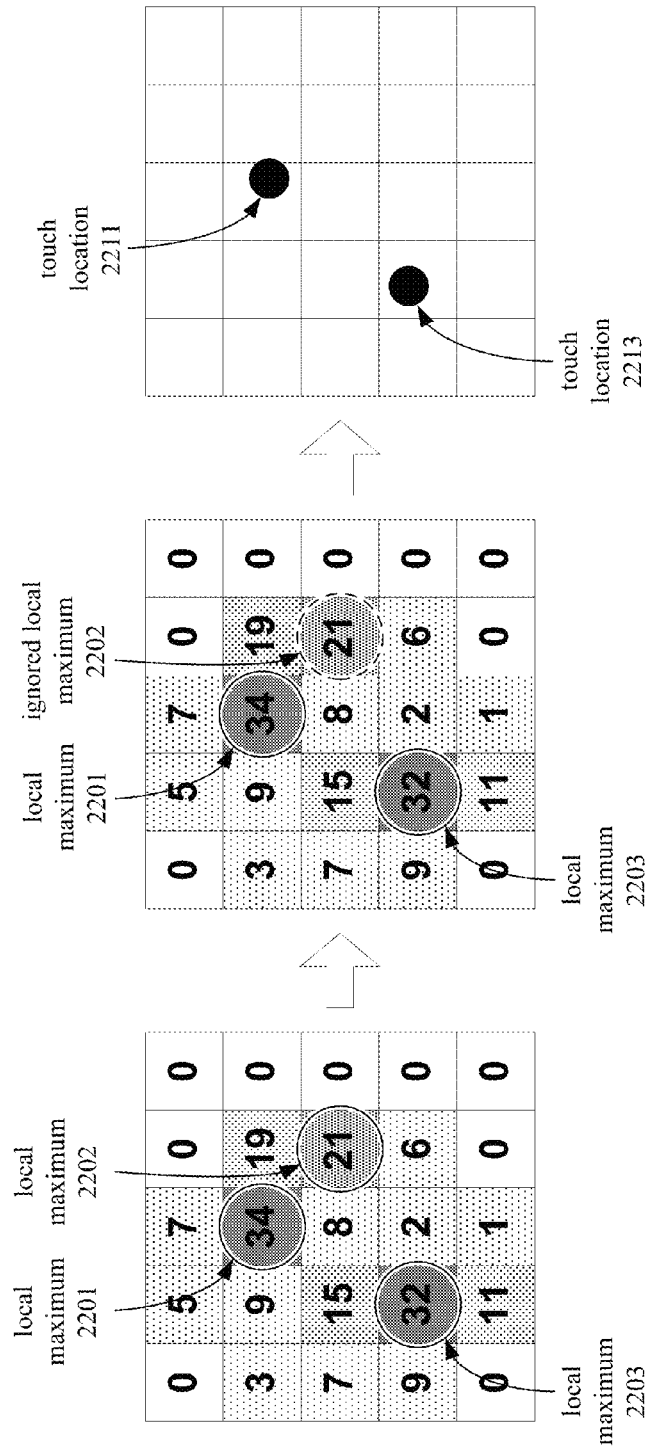
FIG. 22A illustrates heat maps including signal levels acquired from a scan of a touch-sensing surface as processed by a local maxima detection process, according to one embodiment.
FIG. 22B illustrates a map of unit cells for a local maxima detection process, according to one embodiment.

FIG. 22A illustrates the removal of a local maximum according to an embodiment. In one embodiment, the standard local maximum detection process (at block 1203) used on a set of signal levels from a scan of the touch sensing surface may detect local maxima 2201 and 2203. The light local maximum detection process (at block 1803) may detect local maxima 2201, 2202, and 2203.

In one embodiment, the local maximum 2202 may be ignored by being removed from the list of local maxima. In one embodiment, local maxima may be removed according to FIG. 22B and Equation 14:

$$(LM1 \geq LM2) \,\&\&\, ((LM2 + LM2/4) \leq (A + B)) \quad \text{(Equation 14)}$$

Thus, if Equation 14 is evaluated to be true, the local maximum LM2 is ignored. In the example of FIG. 22A, the local maxima 2201 and 2202 correspond to LM1 and LM2, respectively.

In an alternative embodiment, Equation 15 below may be evaluated to determine whether the local maxima LM2 is ignored.

$$(LM1 \geq LM2) \,\&\&\, ((LM1 + LM2) \leq [2 \times (A+B) + (A+B)/2]) \quad \text{(Equation 15)}$$

Thus, if Equation 15 is evaluated to be true, the local maximum LM2 is ignored.

Although FIG. 22B illustrates LM2 as being situated diagonally to the bottom right of LM1, LM2 may be positioned at any of the other three corners of LM1 for local maxima that are detected at those positions.

Figure 23A:
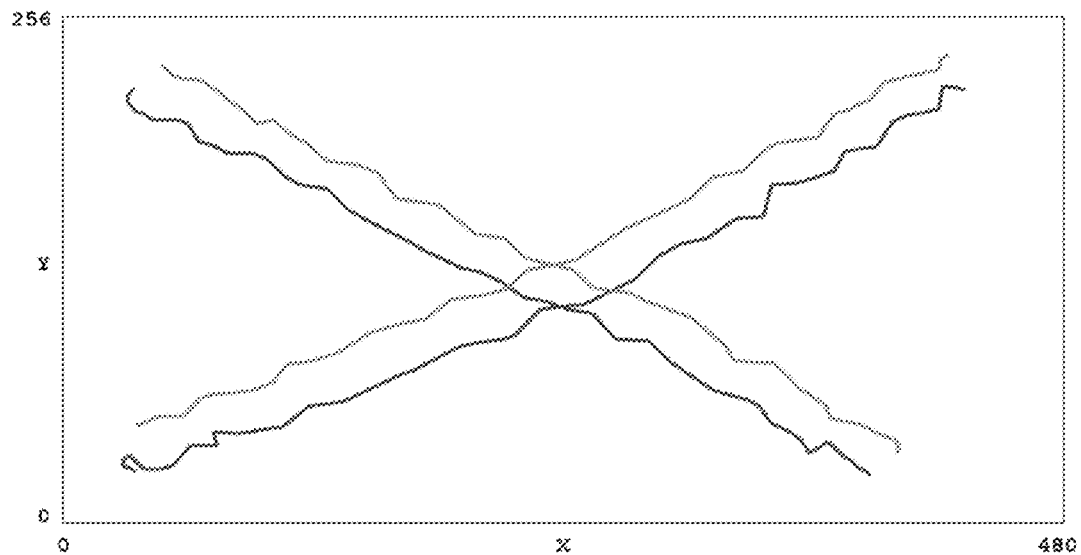
FIGS. 23A and 23B illustrate paths of conductive objects as tracked across a touch-sensing surface, according to one embodiment.
Figure 23B:
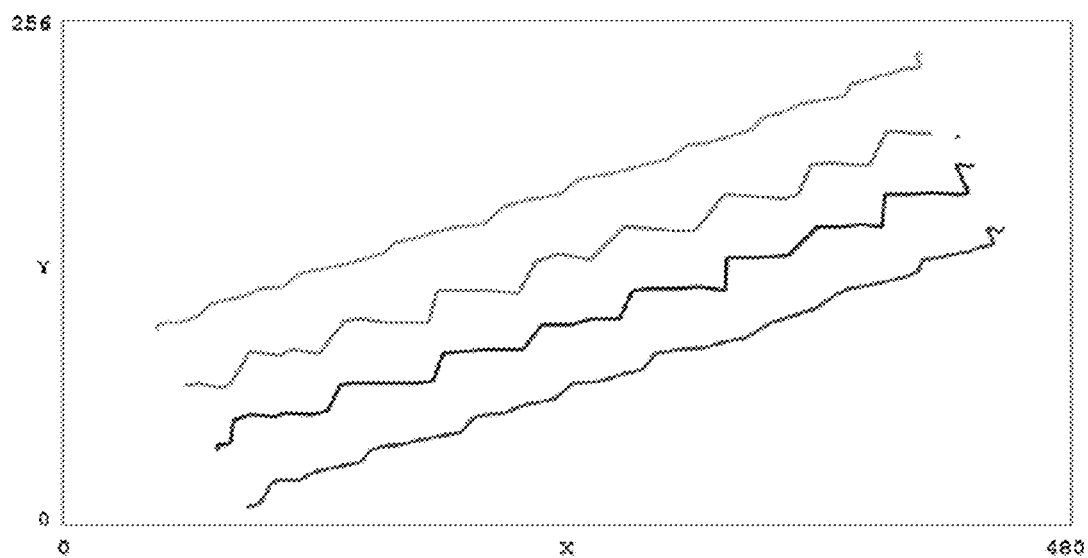

FIGS. 23A and 23B illustrate the paths of touches in motion as tracked across the touch-sensing surface, according to one embodiment. In contrast with FIGS. 6A and 6B, FIGS. 23A and 23B illustrate the effects of the local maxima detection process 1800; specifically, the continuity of each path is preserved and touch IDs are stable for the duration of the touch.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:
    based on a first scan of a touch-sensing surface, detecting an initial location of a first contact and an initial location of a second contact at the touch-sensing surface;
    during a second scan of the touch-sensing surface subsequent to the first scan, detecting a plurality of signal levels caused by the first contact and the second contact, wherein each signal level is associated with one of a plurality of unit cells of the touch-sensing surface;
    identifying a first signal level of the plurality of signal levels as a local maximum; and
    locating a lost touch based on one or more signal levels associated with one or more unit cells within a fixed distance from a first unit cell associated with the local maximum.

2. The method of claim 1, further comprising detecting a close touch condition by determining whether a distance between the initial location of the first contact and the initial location of the second contact locations is less than a threshold distance.

3. The method of claim 1, further comprising assigning a first touch ID corresponding to the unit cell associated with the local maximum.

4. The method of claim 1, further comprising determining whether a signal level associated with the lost touch exceeds a touch threshold.

5. The method of claim 1, further comprising assigning a second touch ID corresponding to a unit cell associated with the lost touch.

6. The method of claim 1, wherein identifying the first signal level as a local maximum comprises determining that the first signal level is higher than a signal level of any unit cell adjacent to a unit cell associated with the first signal level.

7. The method of claim 1, wherein locating the lost touch comprises:
    identifying a second unit cell having a highest signal level from among a subset of the plurality of unit cells, wherein each unit cell in the subset of unit cells is two unit cells away from the first unit cell; and
    assigning to the second unit cell a touch ID corresponding to the lost touch.

8. The method of claim 1, further comprising:
    smoothing a path of the first contact, wherein the path of the first contact is calculated based on locations of the first contact determined by successive scans of the touch-sensing surface; and
    smoothing a path of the second contact, wherein the path of the second contact is calculated based on locations of the second contact determined by the successive scans of the touch-sensing surface.

9. The method of claim 1, wherein identifying the first signal level as a local maximum comprises comparing the first signal level with signal levels of unit cells that are horizontally and vertically adjacent to the first unit cell.

10. The method of claim 9, further comprising:
    adding the local maximum to a list of local maxima; and
    removing one or more local maxima from the list in response to determining that each of the one or more local maxima corresponds to a unit cell that is within a threshold distance from a unit cell corresponding to another local maximum.

11. A method of tracking touches at a touch-sensing surface, the method comprising:
    assign one of a plurality of touch IDs to a location of each of an initial number of local maxima detected from an initial scan of the touch-sensing surface;
    in response to detecting fewer than the initial number of local maxima from a subsequent scan of the touch-sensing surface, determining a location of a lost touch based on signal levels associated with a subset of unit cells surrounding a first unit cell corresponding to one of the local maxima; and assigning one of the plurality of touch IDs to the location of the lost touch.

12. The method of claim 11, wherein determining the location of the lost touch comprises identifying a second unit cell having a highest signal level from among the subset of unit cells, wherein each unit cell in the subset of unit cells is two unit cells away from the first unit cell.

13. The method of claim 11, further comprising smoothing a path of each of a plurality of contacts corresponding to the plurality of touch IDs, wherein the path of each of the plurality of contacts is calculated based on successive scans of the touch-sensing surface.

14. The method of claim 11, further comprising identifying a first signal level measured from a first unit cell as one of the local maxima by comparing the first signal level with signal levels of unit cells that are horizontally and vertically adjacent to the first unit cell.

15. The method of claim 11, further comprising:
adding each of the local maxima to a list of local maxima; and
removing one or more of the local maxima from the list in response to determining that each of the one or more local maxima corresponds to a unit cell that is within a threshold distance from a unit cell corresponding to another local maximum.

16. A capacitance sensing system, comprising:
a processor; and
a memory coupled with the processor, wherein the memory is configured to store instructions that when executed by the processor, cause the processor to perform a method comprising:
based on a first scan of a touch-sensing surface, detecting an initial location of a first contact and an initial location of a second contact at the touch-sensing surface,
during a second scan of the touch-sensing surface subsequent to the first scan, detecting a plurality of signal levels caused by the first contact and the second contact, wherein each signal level is associated with one of a plurality of unit cells of the touch-sensing surface;
identifying a first signal level of the plurality of signal levels as a local maximum, and
locating a lost touch based on one or more signal levels associated with one or more unit cells within a fixed distance from a first unit cell associated with the local maximum.

17. The capacitance sensing system of claim 16, wherein the method further comprises:
assigning a first touch ID corresponding to the unit cell associated with the local maximum; and
assigning a second touch ID corresponding to a unit cell associated with the lost touch.

18. The capacitance sensing system of claim 16, wherein locating the lost touch comprises:
identifying a second unit cell having a highest signal level from among a subset of the plurality of unit cells, wherein each unit cell in the subset of unit cells is two unit cells away from the first unit cell; and
assigning to the second unit cell a touch ID corresponding to the lost touch.

19. The capacitance sensing system of claim 16, wherein identifying the first signal level as a local maximum comprises comparing the first signal level with signal levels of unit cells that are horizontally and vertically adjacent to the first unit cell.

20. The capacitance sensing system of claim 19, wherein the method further comprises:
adding the local maximum to a list of local maxima; and
removing one or more local maxima from the list in response to determining that each of the one or more local maxima corresponds to a unit cell that is within a threshold distance from a unit cell corresponding to another local maximum.

* * * * *